(12) United States Patent
Inagaki

(10) Patent No.: US 8,447,605 B2
(45) Date of Patent: May 21, 2013

(54) INPUT VOICE COMMAND RECOGNITION PROCESSING APPARATUS

(75) Inventor: Yoji Inagaki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1175 days.

(21) Appl. No.: 11/143,464

(22) Filed: Jun. 3, 2005

(65) Prior Publication Data
US 2005/0273323 A1   Dec. 8, 2005

(30) Foreign Application Priority Data

Jun. 3, 2004  (JP) ................... 2004-165700

(51) Int. Cl.
G10L 15/06 (2006.01)
G10L 15/10 (2006.01)
G10L 15/02 (2006.01)
G10L 11/00 (2006.01)

(52) U.S. Cl.
USPC ........... 704/237; 704/239; 704/231; 704/216; 704/270; 704/275

(58) Field of Classification Search
USPC ......... 704/1–4, 273, 277, 207–220, 231–255, 704/270–271, 275, E17.001–E17.016, E15.001–E15.015, E11.001–E11.007; 375/240, 375/300, 320, 346; 381/101; 705/14, 17; 715/203, 716, 723, 728, 767, 811, 863
See application file for complete search history.

(56) References Cited

U.S. PATENT DOCUMENTS

| | | | | |
|---|---|---|---|---|
| 3,649,765 A | * | 3/1972 | Rabiner et al. | 704/209 |
| 3,681,530 A | * | 8/1972 | Manley et al. | 704/203 |
| 3,740,476 A | * | 6/1973 | Atal | 704/207 |
| 4,016,540 A | * | 4/1977 | Hyatt | 704/258 |
| 4,074,069 A | * | 2/1978 | Tokura et al. | 704/208 |
| 4,081,605 A | * | 3/1978 | Kitawaki et al. | 704/217 |
| 4,092,493 A | * | 5/1978 | Rabiner et al. | 704/237 |
| 4,181,813 A | * | 1/1980 | Marley | 704/251 |
| 4,415,767 A | * | 11/1983 | Gill et al. | 704/243 |

(Continued)

FOREIGN PATENT DOCUMENTS

| | | | |
|---|---|---|---|
| EP | 485315 A2 | * | 5/1992 |
| EP | 0 670 537 | | 9/1995 |

(Continued)

OTHER PUBLICATIONS

Rabenja et al. "Speech Recognition for Game Control", The 2nd Annual IEEE Workshop on Circuits and Systems, 2004. NEWCAS 2004., Jun. 20-23, 2004, 97-99.*

(Continued)

*Primary Examiner* — Pierre-Louis Desir
*Assistant Examiner* — David Kovacek
(74) *Attorney, Agent, or Firm* — Nixon & Vanderhye P.C.

(57) ABSTRACT

A game apparatus includes a CPU core for creating an input envelope and a registered envelope. The input envelope has a plurality of envelope values detected from a voice waveform input in real time through a microphone. The registered envelope has a plurality of envelope values detected from a voice waveform previously input. Both of the input envelope and the registered envelope are stored in a RAM. The CPU core evaluates difference of the envelope values between the input envelope and the registered envelope. When an evaluated value satisfies a condition, the CPU core executes a process according to a command assigned to the registered envelope.

25 Claims, 18 Drawing Sheets

U.S. PATENT DOCUMENTS

| | | | | |
|---|---|---|---|---|
| 4,532,648 A * | 7/1985 | Noso et al. | | 704/275 |
| 4,559,602 A * | 12/1985 | Bates, Jr. | | 702/71 |
| 4,665,548 A * | 5/1987 | Kahn | | 704/237 |
| 4,672,667 A * | 6/1987 | Scott et al. | | 704/231 |
| 4,707,857 A * | 11/1987 | Marley et al. | | 704/243 |
| 4,813,076 A * | 3/1989 | Miller | | 704/254 |
| 4,833,714 A * | 5/1989 | Shimotani et al. | | 704/253 |
| 4,852,168 A * | 7/1989 | Sprague | | 704/211 |
| 4,862,503 A * | 8/1989 | Rothenberg | | 704/235 |
| 4,955,056 A * | 9/1990 | Stentiford | | 704/239 |
| 4,969,193 A * | 11/1990 | Scott et al. | | 704/216 |
| 5,025,471 A * | 6/1991 | Scott et al. | | 704/237 |
| 5,091,949 A * | 2/1992 | King | | 704/253 |
| 5,121,428 A * | 6/1992 | Uchiyama et al. | | 704/243 |
| 5,171,930 A * | 12/1992 | Teaney | | 84/725 |
| 5,473,759 A * | 12/1995 | Slaney et al. | | 704/266 |
| 5,536,902 A * | 7/1996 | Serra et al. | | 84/623 |
| 5,640,490 A * | 6/1997 | Hansen et al. | | 704/254 |
| 5,708,759 A * | 1/1998 | Kemeny | | 704/254 |
| 5,749,065 A * | 5/1998 | Nishiguchi et al. | | 704/200.1 |
| 5,799,276 A * | 8/1998 | Komissarchik et al. | | 704/251 |
| 5,864,814 A * | 1/1999 | Yamazaki | | 704/270.1 |
| 5,870,705 A * | 2/1999 | McAuliffe et al. | | 704/225 |
| 5,873,062 A * | 2/1999 | Hansen et al. | | 704/254 |
| 5,884,257 A * | 3/1999 | Maekawa et al. | | 704/248 |
| 6,111,580 A * | 8/2000 | Kazama et al. | | 715/863 |
| 6,167,375 A * | 12/2000 | Miseki et al. | | 704/229 |
| 6,226,604 B1 * | 5/2001 | Ehara et al. | | 704/207 |
| 6,246,978 B1 * | 6/2001 | Hardy | | 704/201 |
| 6,349,277 B1 * | 2/2002 | Kamai et al. | | 704/207 |
| 6,418,405 B1 * | 7/2002 | Satyamurti et al. | | 704/206 |
| 6,490,562 B1 * | 12/2002 | Kamai et al. | | 704/258 |
| 6,538,666 B1 | 3/2003 | Ozawa et al. | | |
| 6,553,061 B1 * | 4/2003 | Hardy | | 375/220 |
| 6,748,354 B1 * | 6/2004 | King | | 704/202 |
| 6,772,126 B1 * | 8/2004 | Simpson et al. | | 704/500 |
| 6,873,955 B1 * | 3/2005 | Suzuki et al. | | 704/503 |
| 7,088,835 B1 * | 8/2006 | Norris et al. | | 381/107 |
| 7,177,806 B2 * | 2/2007 | Washio | | 704/226 |
| 7,587,322 B2 * | 9/2009 | Schimmer et al. | | 704/257 |
| 2001/0034600 A1 * | 10/2001 | Yasunaga et al. | | 704/219 |
| 2002/0032563 A1 * | 3/2002 | Kamai et al. | | 704/207 |
| 2002/0082834 A1 * | 6/2002 | Eaves et al. | | 704/251 |
| 2002/0093841 A1 * | 7/2002 | Kitayama et al. | | 365/1 |
| 2003/0093273 A1 * | 5/2003 | Koyanagi | | 704/237 |
| 2003/0130843 A1 * | 7/2003 | Ky | | 704/235 |
| 2003/0163304 A1 * | 8/2003 | Mekuria et al. | | 704/207 |
| 2004/0054539 A1 * | 3/2004 | Simpson | | 704/270.1 |
| 2004/0165730 A1 * | 8/2004 | Crockett | | 381/56 |
| 2004/0193406 A1 * | 9/2004 | Yamato et al. | | 704/207 |
| 2005/0015258 A1 * | 1/2005 | Somani et al. | | 704/278 |
| 2005/0195990 A1 * | 9/2005 | Kondo et al. | | 381/92 |
| 2005/0273323 A1 * | 12/2005 | Inagaki | | 704/214 |
| 2006/0217986 A1 * | 9/2006 | Mizuki et al. | | 704/275 |
| 2007/0021958 A1 * | 1/2007 | Visser et al. | | 704/226 |
| 2007/0100615 A1 * | 5/2007 | Gotanda et al. | | 704/226 |

FOREIGN PATENT DOCUMENTS

| | | |
|---|---|---|
| EP | 1164578 A2 * | 12/2001 |
| JP | 58-25699 | 2/1983 |
| JP | 11-319330 | 11/1999 |
| JP | 2000-181676 | 6/2000 |
| JP | 2002-273036 | 9/2002 |

OTHER PUBLICATIONS

Atkinson et al. "Time Envelope Vocoder, a New LP Based Coding Strategy for Use at Bit Rates of 2.4 kb/s and Below", IEEE Journal on Selected Areas in Communications, Feb. 1995, 449-457 vol. 13.*

Webster's II New Riverside University Dictionary. Riverside Publishing Company 1994.*

* cited by examiner (A) REGISTERED ENVELOPE OF "JUMP"

(B) REGISTERED ENVELOPE OF "RIGHT"

(A) WHEN S=-1

(B) WHEN S=0

(C) WHEN S=+1

(A)

(B)

INPUT VOICE COMMAND RECOGNITION PROCESSING APPARATUS

This application claims priority to JP 2004-165700 filed 3 Jun. 2004, the entire content of which is hereby incorporated by reference.

BACKGROUND

1. Field of the Technology

The present technology relates to a command processing apparatus applicable to a game apparatus, for example. More specifically, the present invention relates to a command processing apparatus that executes a process according to an input voice command.

2. Description of the Prior Art

One example of such a kind of conventional apparatus is disclosed in a reference 1 (Patent Laying-open No. 11-319330) and a reference 2 (Patent Laying-open No. 2000-181676). According to the reference 1, when a voice is input to a microphone provided in a voice responsive toy, a voice pattern being coincident with the input voice pattern is specified out of a plurality of voice patterns stored in a memory. The voice responsive toy performs a movement in association with the specified voice pattern.

Furthermore, according to the reference 2, when an emitted voice by a player is taken by a microphone, a word corresponding to the emitted voice is detected by a voice recognition unit. A state of a character displayed on a screen changes on the basis of the detected word.

However, the reference 1 fails to disclose anything about a checking method of the voice pattern. Furthermore, since in the reference 2, it is necessary to detect a word corresponding to the emitted voice, this puts a heavy load on the voice recognition unit.

SUMMARY

Therefore, it is a primary feature of the exemplary embodiment presented herein to provide a novel command processing apparatus.

Another feature of the exemplary embodiment is to provide a command processing apparatus capable of executing a process corresponding to an input voice command at a low load.

According to an exemplary embodiment, the command processing apparatus has a creating means, a storing means, an evaluating means, and an executing means. The creating means creates input waveform information including a plurality of amplitude values on a voice waveform input in real time. The storing means stores registered waveform information including a plurality of amplitude values on a voice waveform input in advance. The evaluating means acquires an evaluated value on the basis of the amplitude values of the input waveform information and the amplitude values of the registered waveform information. The executing means executes a process corresponding to a command assigned to the registered waveform information when the evaluated value acquired by the evaluating means satisfies a condition.

The input waveform information includes the plurality of amplitude values on the voice waveform input in real time, and the registered waveform information includes the plurality of amplitude values on the voice waveform input in advance. The input waveform information is created by the creating means (S63-S79), and the registered waveform information is stored by the storing means (98). The evaluating means (S87-S93) acquires the evaluated value on the basis of the amplitude values of the input waveform information and the amplitude values of the registered waveform information. When the evaluated value by the evaluating means satisfies the condition, a process corresponding to the command assigned to the registered waveform information is executed by the executing means (S107, S109, S13).

Since the difference of the amplitude values is evaluated, it is possible to execute a processing according to an input voice command at a low load.

According to an exemplary embodiment, amplitude values belonging to the respective input waveform information and the registered waveform information are represented by an absolute value. Thus, it is possible to decrease a load of the processing.

According to an exemplary embodiment, each of the input waveform information and the registered waveform information has L (L: two or more integer) amplitude values which are respectively detected at L positions. The evaluating means evaluates differences between M (M: integer less than L) amplitude values that are included in the input waveform information and respectively correspond to M detecting positions, and M amplitude values that are included in the registered waveform information and respectively correspond to M detecting positions. The changing means (S97) changes the noticed M detecting positions as to one of the input waveform information and the registered waveform information every time that an evaluating process of said evaluating means is completed. Thus, it is possible to easily obtain a proper evaluated value.

According to an exemplary embodiment, the changing means changes the noticed M detecting positions at N times (N: an integer less than "L-M"). The specifying means (S99) specifies an optimum evaluated value from among the N evaluated values acquired by the evaluating means. The executing means notices the optimum evaluated value. Thus, it is possible to increase the probability that the evaluated value satisfies the condition.

According to an exemplary embodiment, the evaluating means includes a first position specifying means, a second position specifying means, and a calculating means. The first position specifying means (S117) specifies a first detecting position which satisfies a first condition, the second position specifying means (S123) specifies a second detecting position which satisfies a second condition, and the calculating means (S131-S135) calculates the evaluated value on the basis of the number of the first detecting positions and the number of the second detecting positions. Here, the first condition is a condition that the difference is below a threshold value. The second condition is a condition that the difference at a detecting position anteriorly adjacent to the first detecting position is below the threshold value.

According to an exemplary embodiment, the evaluating means further includes a threshold value changing means. The threshold value changing means (S115) changes for each detecting position a numerical value indicated by the threshold value on the basis of the amplitude values of the registered waveform information. Thus, it is possible to precisely evaluate the difference.

According to an exemplary embodiment, the threshold value changing means increases the numerical value as the amplitude values are large.

According to an exemplary embodiment, the storing means stores the registered waveform information in correspondence to a plurality of commands. The evaluating means acquires the evaluated value with respect to each of the plurality of commands. Thus, it is possible to realize a variety of the processing.

According to other exemplary embodiments, it is possible to execute a processing according to an input voice command at a low load.

According to an exemplary embodiment, the command processing apparatus includes a creating means, a storing means, an evaluating means, an executing means, a changing means, and a specifying means. The creating means creates input waveform information including a plurality of amplitude values on a voice waveform input in real time. The storing means stores registered waveform information including a plurality of amplitude values on a voice waveform input in advance. The evaluating means acquires an evaluated value on the basis of the amplitude values of the input waveform information and the amplitude values of the registered waveform information. The executing means executes a process corresponding to a command assigned to the registered waveform information when the evaluated value acquired by the evaluating means satisfies a condition.

Each of the input waveform information and the registered waveform information has L (L: two or more integer) amplitude values which are respectively detected at L positions. The evaluating means evaluates differences between M (M: integer less than L) amplitude values that are included in the input waveform information and respectively correspond to M detecting positions, and M amplitude values that are included in the registered waveform information and respectively correspond to the M detecting positions.

The changing means changes the noticed M detecting positions as to one of the input waveform information and the registered waveform information every time that an evaluating process of the evaluating means is completed. The specifying means specifies an optimum evaluated value from among the N evaluated values acquired by the evaluating means. The executing means notices the optimum evaluated value. The storing means stores the registered waveform information in correspondence to a plurality of commands, and the evaluating means acquires the evaluated value with respect to each of the plurality of commands.

The above described features, aspects and advantages of the exemplary embodiment presented herein will become more apparent from the following detailed description of the exemplary embodiment when taken in conjunction with the accompanying drawings.

BRIEF DESCRIPTION OF THE DRAWINGS

FIG. 17 (B) is an illustrative view showing one example of the registered envelope corresponding to a voice command of "right";

FIG. 19 (B) is an illustrative view showing another example of the verification operation between the input envelope and the registered envelope;

FIG. 19 (C) is an illustrative view showing the other example of the verification operation between the input envelope and the registered envelope;

FIG. 20 (B) is an illustrative view showing another part of the operation of FIG. 1 embodiment in the game play mode.

DETAILED DESCRIPTION OF THE PREFERRED EMBODIMENTS

Figure 1:
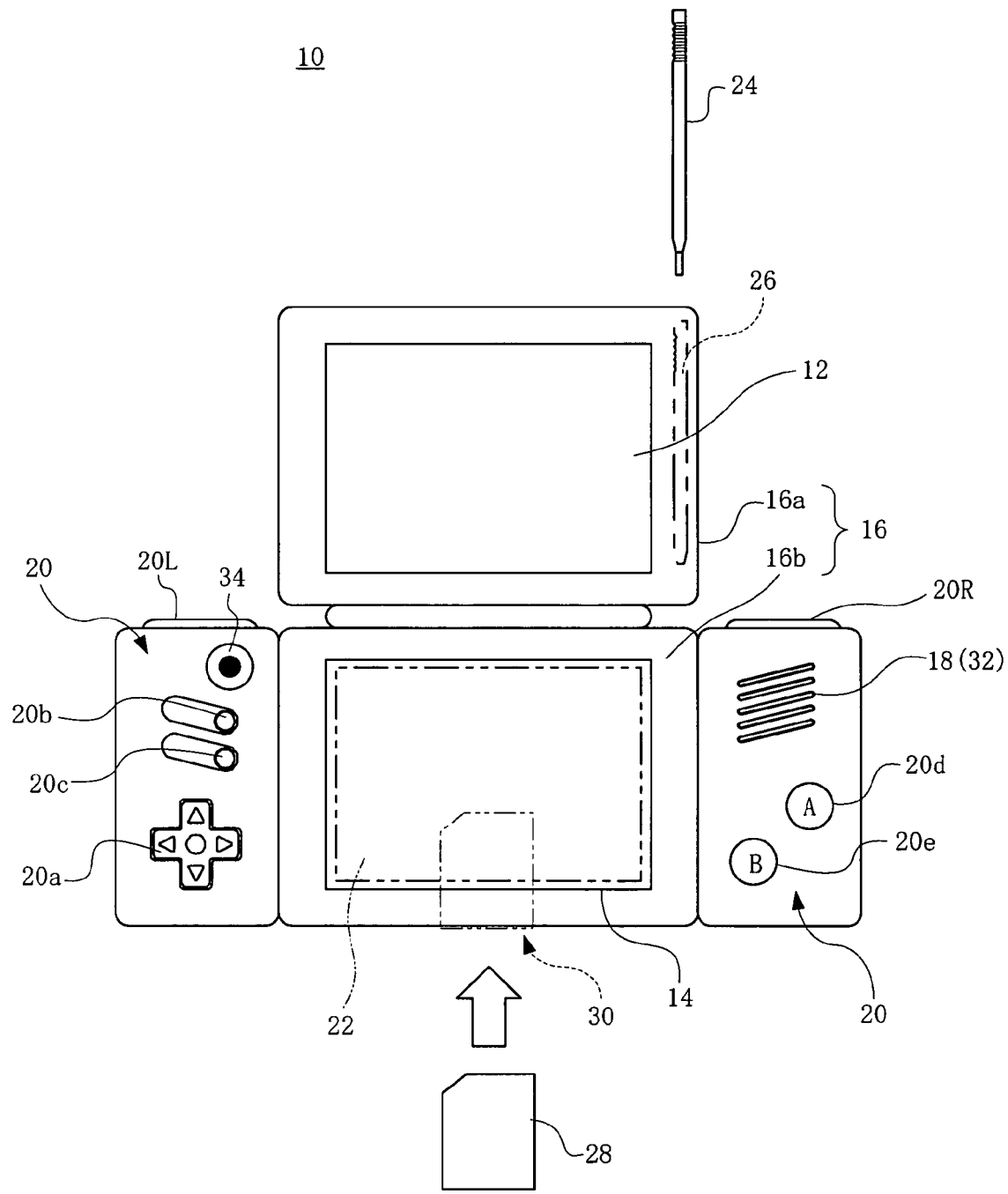
FIG. 1 is an illustrative view showing appearance of one embodiment.

Referring to FIG. 1, a game apparatus 10 of one embodiment includes LCDs (liquid crystal display) 12 and 14. The LCDs 12 and 14 are provided on a housing 16 so as to be arranged in a predetermined position. In this embodiment, the housing 16 consists of an upper housing 16a and a lower housing 16b. The LCD 12 is provided on the upper housing 16a while the LCD 14 is provided on the lower housing 16b. Accordingly, the LCDs 12 and 14 are closely arranged so as to be longitudinally (vertically) parallel with each other.

It is noted that although the LCD is utilized as a display in this embodiment, an EL (Electronic Luminescence) display and a plasma display may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. Furthermore, the lower housing 16b is provided with a sound hole 18 and an operating switch 20 (20a, 20b, 20c, 20d, 20e, 20L and 20R).

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surfaces of the LCDs 12 and 14 from being damaged. It is noted that in place of rotatably connecting the upper housing 16a and the lower housing 16b with each other, the upper housing 16a and the lower housing 16b may integrally be formed.

The operating switch 20 includes a direction instructing switch (cross switch) 20a, a start switch 20b, a select switch 20c, an action switch (A button) 20d, an action switch (B button) 20e, an action switch (L button) 20L, and an action switch (R button) 20R. The switches 20a, 20b and 20c are placed at the left of the LCD 14 on the one main surface of the lower housing 16b Also, the switches 20d and 20e are placed at the right of the LCD 14 on the one main surface of the lower housing 16b. Furthermore, the switches 20L and 20R are placed in a part of an upper edge (top surface) of the lower housing 16b, and lie of each side of the connected portion with the upper housing 16a.

The direction instructing switch 20a functions as a digital joystick, and is utilized for instructing a moving direction of a player character (or player object) to be operated by a player, instructing a moving direction of a cursor, and so forth by operating any one of four depression portions. The start switch 20b is formed of a push button, and is utilized for starting (restarting), temporarily stopping (pausing) a game, and so forth. The select switch 20c is formed of the push button, and utilized for a game mode selection, etc.

The action switch 20d, that is, the A button is formed of the push button, and allows the player character to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 20e, that is, the B button is formed of the push button, and is utilized for changing a game mode selected by the select switch 20c, canceling an action determined by the A button 20d, and so forth.

The action switch (left depression button) 20L and the action switch (right depression button) 20R are formed of the push button, and the left depression button (L button) 20L and the right depression button (R button) 20R can be utilized for the same operation as the A button 20d and the B button 20e, and can also be utilized for an operation of a subsidiary of the A button 20d and the B button 20e.

Also, the game apparatus 10 is a game apparatus with the use of a touch panel, and the touch panel 22 is provided on a top surface of the LCD 14. As the touch panel 22, any one of a resistance film system, an optical system (infrared rays system), and an electrostatic capacitive coupling system can be utilized. In response to an operation by depressing, stroking (touching), and so forth with a stick 24 such as stylus pen, or a finger (hereinafter, referred to as "stick 24, etc.") on a top surface of the touch panel 22, the touch panel 22 detects a coordinates position of the stick 24, etc. to output coordinates position data.

It is noted that in this embodiment, a resolution of the display surface of the LCD 14 is 256 dots×192 dots (this is true for the LCD 12), and a detection accuracy of a detection surface of the touch panel 22 is also rendered 256 dots×192 dots in correspondence to the resolution of the display surface. However, the detection accuracy of the detection surface of the touch panel 22 may be lower than the resolution of the display surface, or higher than it.

In this embodiment, a game screen to be viewed by the player is displayed on the LCD 12, and a game screen to be viewed and operated by the player in association with the game screen of the LCD 12 is displayed on the LCD 14. Here, the game screen to be displayed on the LCD 14 includes an object, an icon, text information, etc. operable (touchable) by the stick, etc. The player directly touches the object displayed on the LCD 14 by the stick 24, etc. to thereby perform the object selection, the coordinates input, etc.

Also, it is possible to instruct other various inputs depending on the kind of the game. For example, it is possible to select texture information and a command icon displayed on the display screen of the LCD 14, and instruct a scrolling direction of the game screen (map) displayed on the LCD 12.

Thus, the game apparatus 10 has the LCD 12 and the LCD 14 as a display portion of two screens, the touch panel 22 is provided on the display screen of the LCD 14, and the operating switch 20 is provided on the lower housing 16b. That is, the game apparatus 10 has two screens (LCD 12, 14) and two systems of the operating portions (20, 22).

Furthermore, in this embodiment, the stick 24 can be inserted into a housing portion 26 provided in proximity to a right side surface of the upper housing 16a, for example, and taken out therefrom as necessary. It is noted that in a case of preparing no stick 24, it is not necessary to provide the housing portion 26.

Also, the game apparatus 10 includes a memory card (or game cartridge) 28. The memory card 28 is detachable, and inserted into a loading slot 30 provided on a rear surface or a lower edge (bottom surface) of the lower housing 16b. A connector 46 (see FIG. 2) is provided at a depth portion of the loading slot 30 for connecting a connector (not shown) provided at an end portion of the memory card 28 in the loading direction. Therefore, when the memory card 28 is loaded into the loading slot 30, the connectors are connected with each other, and the memory card 28 is accessible by a CPU core 42 (see FIG. 2) of the game apparatus 10.

A microphone 34 for fetching a sound is provided at the right side of the LCD 14, and a speaker 32 (see FIG. 2) is provided at a position corresponding to the sound hole 18 inside the lower housing 16b.

Furthermore although omitted in FIG. 1, for example, a battery accommodating box is provided on a rear surface of the lower housing 16b. A power switch, a volume switch, an external expansion connector, an earphone jack, etc. are provided on a bottom surface of the lower housing 16b.

Figure 2:
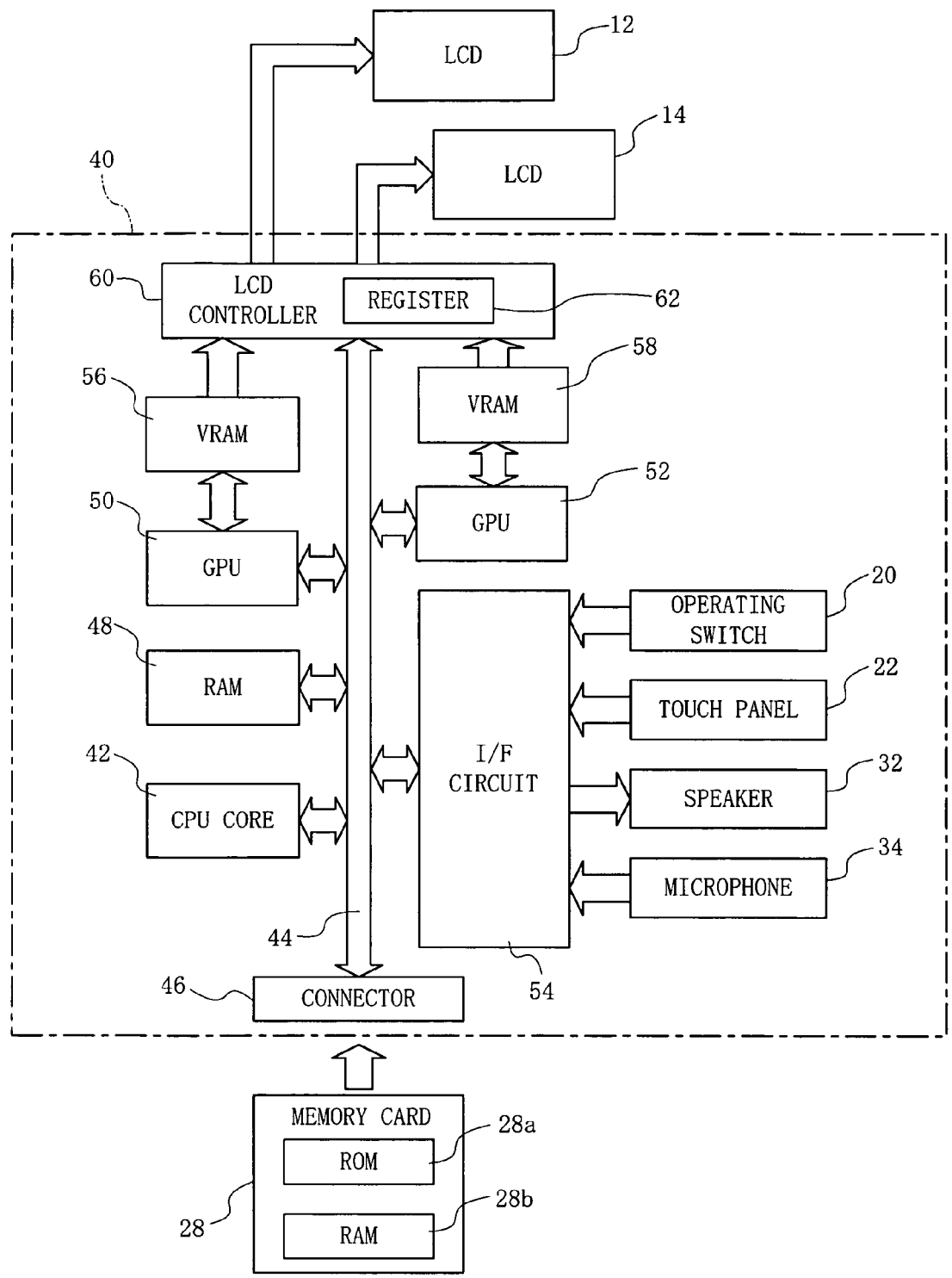
FIG. 2 is a block diagram showing one example of an internal configuration of FIG. 1 embodiment.

FIG. 2 is a block diagram showing an electric configuration of the game apparatus 10. Referring to FIG. 2, the game apparatus 10 includes an electronic circuit board 40, and on the electronic circuit board 40, a circuit component such as the CPU core 42, etc. is mounted. The CPU core 42 is connected to the connector 46, a RAM 48, a GPU (Graphics Processing Unit) 50, a GPU 52, an I/F circuit 54, and an LCD controller 60 via a bus 44.

The connector 46 is detachably connected with the memory card 28 as described above. The memory card 28 includes a ROM 28a and a RAM 28b. Although illustration is omitted, the ROM 28a and the RAM 28b are connected with each other via a bus, and also connected with a connector (not shown) to be connected with the connector 46. Accordingly, the CPU core 42 gains access to the ROM 28a and the RAM 28b as described above.

The ROM 28a stores in advance a game program for a game to be executed by the game apparatus 10, image data such as a character image, a background image, an item image, a message image, etc., and sound data such as an effective sound, a BGM, an onomatopoeic sound of the character, etc. The backup RAM 28b saves proceeding data and result data of the game.

The RAM 48 is utilized as a buffer memory or a working memory. That is, the CPU core 42 loads the game program, the image data, the sound data, etc. stored in the ROM 28a of the memory card 28 into the RAM 48, and executes the loaded game program. The CPU core 42 stores in the RAM 48 temporary data such as game data, flag data, etc. in correspondence with progress of the game.

It is noted that such the game program, the image data, the sound data, etc. are loaded from the ROM 28a entirely at a time, or partially and sequentially so as to be stored into the RAM 48.

Each of the GPU 50 and the GPU 52 forms a part of a rendering means, is constructed by, for example, a single chip ASIC. The GPU 50 or the CPU 52 receives a graphics command (construction command) from the CPU core 42 to generate game image data according to the graphics command. Here, the CPU core 42 applies to each of the GPU 50 and the GPU 52 an image generating program (included in the game program) necessary for generating the game image data in addition to the graphics command.

It is noted that data (image data such as a polygon, a texture, etc.) necessary for executing the graphics command is stored in the RAM 48, and obtained by the GPU 50 or the CPU 52.

Furthermore, the GPU 50 is connected with a VRAM 56, and the GPU 52 is connected with a VRAM 58. The GPU 50 renders the created game image data in the VRAM 56, and the GPU 52 renders the created game image data in the VRAM 58.

The VRAM 56 and the VRAM 58 are connected to the LCD controller 60. The LCD controller 60 includes a register 62. The register 62 consists of one bit, for example, and stores a data value of "0" or "1" according to an instruction of the CPU core 42. The LCD controller 60 outputs the game image data rendered in the VRAM 56 to the LCD 12, and outputs the game image data rendered in the VRAM 58 to the LCD 14 in a case that the data value of the register 62 is "0". Furthermore, the LCD controller 60 outputs the game image data rendered in the VRAM 56 to the LCD 14, and outputs the game image data rendered in the VRAM 58 to the LCD 12 in a case that the data value of the register 62 is "1".

The I/F circuit 54 is connected with the operating switch 20, the touch panel 22, the speaker 32, and the microphone 34. Here, the operating switch 20 is the above-described switches 20a, 20b, 20c, 20d, 20e, 20L and 20R. When the operating switch 20 is operated, a corresponding operation signal (operation data) is input to the CPU core 42 via the I/F circuit 54. Furthermore, the coordinates data detected from the touch panel 22, the sound data fetched by the microphone 34 are also input to the CPU core 42 via the I/F circuit 54. In addition, the CPU core 42 reads the sound data necessary for the game such as a BGM, a sound effect, an onomatopoeic sound of the game character, etc. from the RAM 48, and outputs it from the speaker 32 via the I/F circuit 54.

Figure 3:
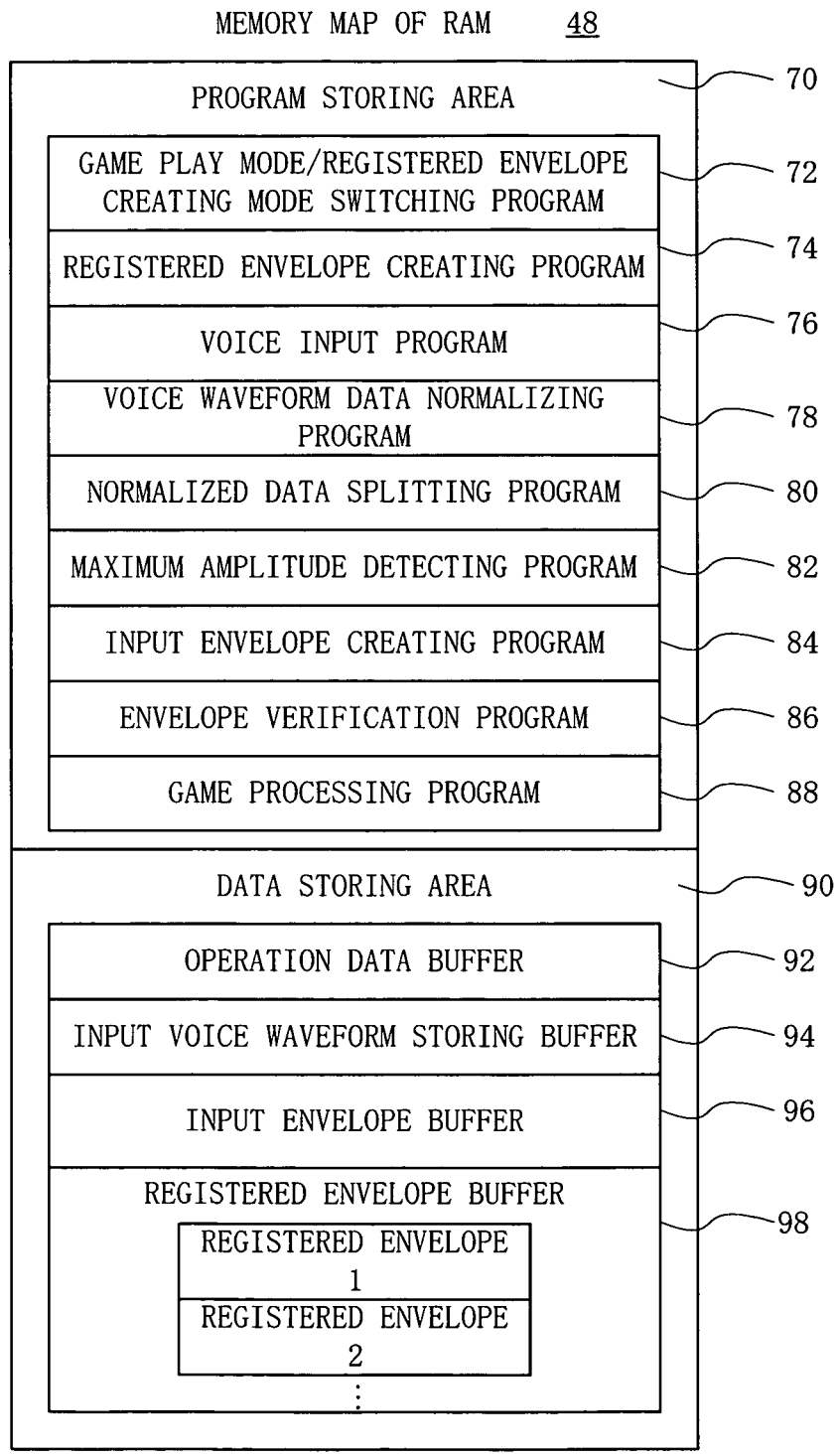
FIG. 3 is an illustrative view showing one example of a mapping state of a RAM applied to FIG. 1 embodiment.

FIG. 3 shows one example of a memory map of the RAM 48. The RAM 48 includes a program storing area 70 for storing programs loaded from the ROM 28a of the memory card 28. The loaded program includes a game play mode/registered envelope creating mode switching program 72, a registered envelope creating program 74, a voice input program 76, a voice waveform data normalizing program 78, a normalized data splitting program 80, a maximum amplitude detecting program 82, an input envelope creating program 84, an envelope verification program 86, a game processing program 88, etc.

It is noted that the program storing area 70, although illustration is omitted, stores other various programs required for progress of the game such as programs for reproducing/outputting a game image and a game sound.

The game play mode/registered envelope creating mode switching program 72 is a program for switching an operation mode between a game play mode and a registered envelope creating mode.

The registered envelope creating program 74 is a program for assigning an envelope (voice waveform information) created on the basis of a voice input by a player to a command required for operating a player character, and is executed in the registered envelope creating mode. When the player emits to the microphone 34 a word such as "jump", "stop", "right", "left", "pause", and "end", envelopes based on these voices are respectively assigned to a "jump" command, a "stop" command, a "right" command, a "left" command, a "pause" command, and a "end" command.

The voice input program 76 is a program for inputting the voice emitted by the player through the microphone 34, and a voice waveform data normalizing program 78 is a program for normalizing waveform data corresponding to the input voice.

The normalized data split program 80 is a program for splitting the normalized waveform data into 150 equal parts, and the maximum amplitude detecting program 82 is a program for detecting a maximum amplitude (absolute value) from each of partial waveform data.

The input envelope creating program 84 is a program for creating an envelope on the basis of a voice input by the player in the game play mode. The envelope verification program 86 is a program for verifying an envelope created by the input envelope creating program with each of a plurality of envelops created in the registered envelope creating mode.

The game processing program 88 is a program for executing a process according to an issued command. For example, when the "jump" command is issued, a player character jumps, and when the "right" command is issued, the player character moves to the right.

Furthermore, the RAM 48 includes a data storing area 90. The data storing area 90 includes an operation data buffer 92, an input voice waveform storing buffer 94, an input envelope data buffer 96, and a registered envelope data buffer 98. The operation data buffer 92 temporarily stores data corresponding to an operation of the operating switch 20. The input voice waveform storing buffer 94 temporarily stores the waveform data of a voice input by the voice input program 76.

The input envelope data buffer 96 temporarily stores an envelope created by the input envelope creating program 84. The registered envelope data buffer 98 temporarily stores a plurality of envelopes created by the registered envelope creating program 74.

A description is made by use of FIG. 4-FIG. 11 on a processing operation of the CPU core 42 when a game play is performed in this game apparatus 10.

Figure 4:
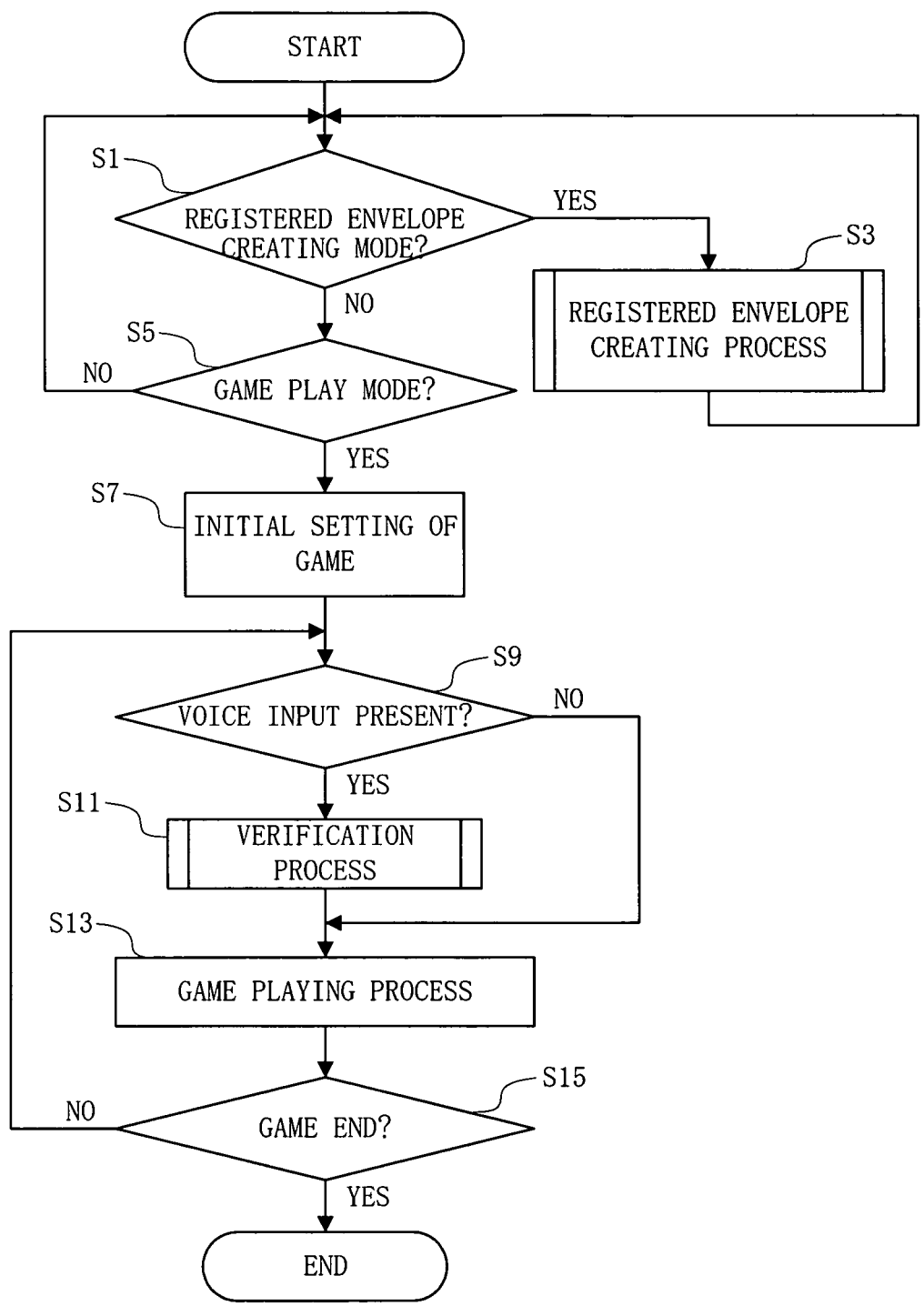
FIG. 4 is a flowchart showing a part of an operation of a CPU core applied to FIG. 1 embodiment.

First, referring to FIG. 4, a current mode is identified in steps S1 and S5. When the current mode is the registered envelope creating mode, "YES" is determined in the step S1, and a registered envelope creating process is executed in a step S3. After completion of the process, the process returns to the step S1.

When the current operation mode is the game play mode, "YES" is determined in the step S5, and an initial setting of the game is performed in a step S7. In a step S9, it is determined whether or not a voice is input through the microphone 34. If "NO" here, the process directly proceeds to a step S13 to perform a game playing process. On the other hand, if "YES" in the step S9, a verification process is performed in a step S11, and then, the process proceeds to the step S13 to perform the game playing process.

It is determined whether or not the game is ended in a step S15. If "NO", the process returns to the step S9 while if "YES", the process is ended.

Figure 5:
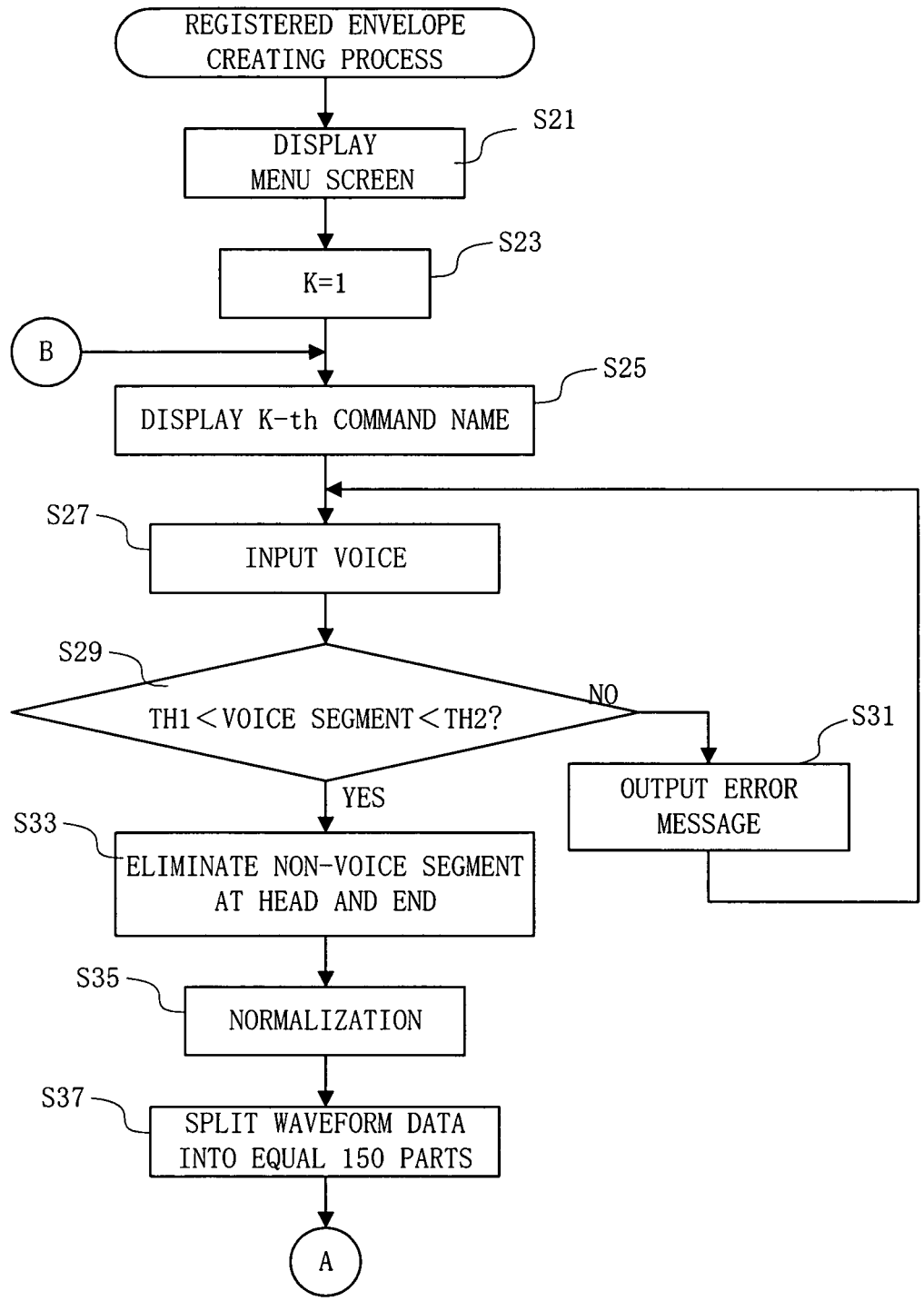
FIG. 5 is a flowchart showing another part of the operation of the CPU core applied to FIG. 1 embodiment.
Figure 6:
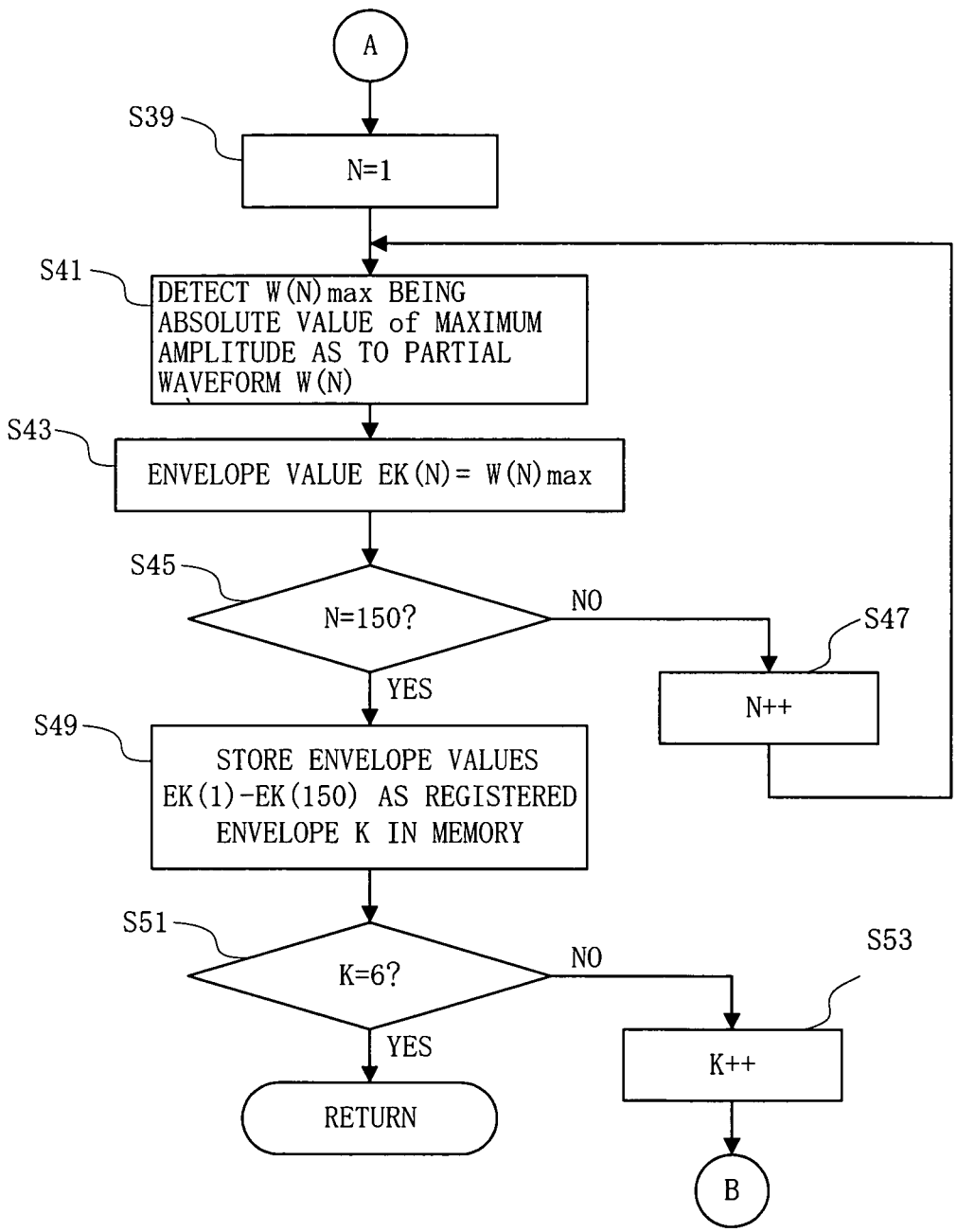
FIG. 6 is a flowchart showing the other part of the operation of the CPU core applied to FIG. 1 embodiment.
Figure 12:
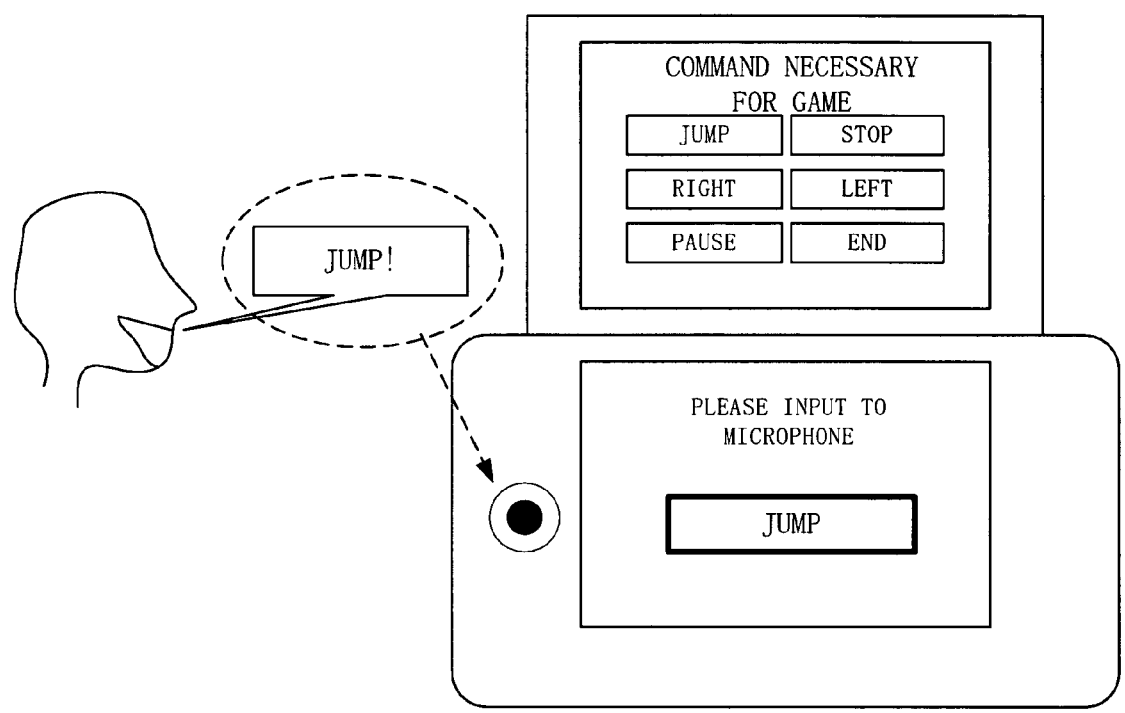
FIG. 12 is an illustrative view showing a part of an operation in FIG. 1 embodiment in a registered envelope creating mode.

The registered envelope creating process in the step S3 is executed according to a flowchart in FIG. 5-FIG. 6. First, a menu screen is displayed on the LCD 12 in a step S21, "1" is set in a variable K in a step S23, and then, a command input message describing the K-th command name is displayed on the LCD 14 in a step S25. The menu screen and the command input message are displayed on the LCDs 12 and 14 in a manner shown in FIG. 12. According to FIG. 12, the menu screen has six menu items of "jump", "stop", "right", "left", "pause" and "end". Also, inputting the voice command of "jump" is prompted by the command input message.

A voice command including a voice section and non-voice section is input through the microphone 34 in a step S27, and the voice section is determined with regard to the input voice command in a step S29. If a length of the voice section is equal to or less than a threshold value TH1, or is equal to or more than a threshold value TH2, an error message is output in a step S31, and the process returns to the step S27. In contrast thereto, if the length of the voice section is above the threshold value TH1 and below the threshold value TH2, the process proceeds to a step S33 to eliminate a non-voice component from a head and an end of the waveform data representing the input voice command. In a step S35, the waveform data from which the non-voice component is eliminated is normalized, and in a succeeding step S37, the normalized waveform data is split into equal 150 parts.

Figure 13:
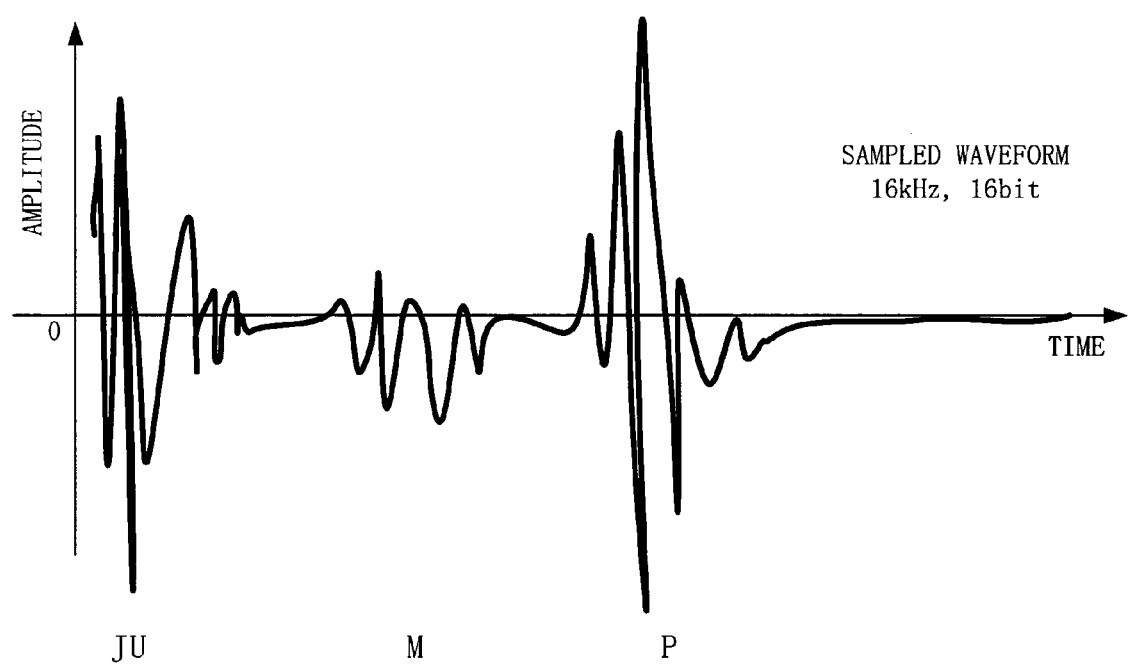
FIG. 13 is a graph showing one example of a voice waveform representing "jump"

When the voice command issued by the player is "jump", waveform data shown in FIG. 13 is obtained by the process in the steps S33 and S35. The obtained waveform data is split into 150 partial waveforms W (1)-W (150) as shown in FIG. 14 by the process in the step S37.

In a step S39, "1" is set in a variable N. In a step S41, an absolute value W (N) max which is an absolute value of the maximum amplitude as to a partial waveform W (N) is detected (see FIG. 14), and in a step S43, the detected absolute value W (N) max is set as an envelope value EK (N).

In a step S45, it is determined whether or not the variable N reaches "150". If "NO" here, the variable N is incremented in a step S47, and then, the process returns to the step S41. Thus, the absolute values W (1) max-W (150) max are respectively detected from the partial waveforms W (1)-W (150), and the detected absolute values W (1) max-W (150) max are respectively set as the envelope values EK (1)-EK (150).

Figure 14:
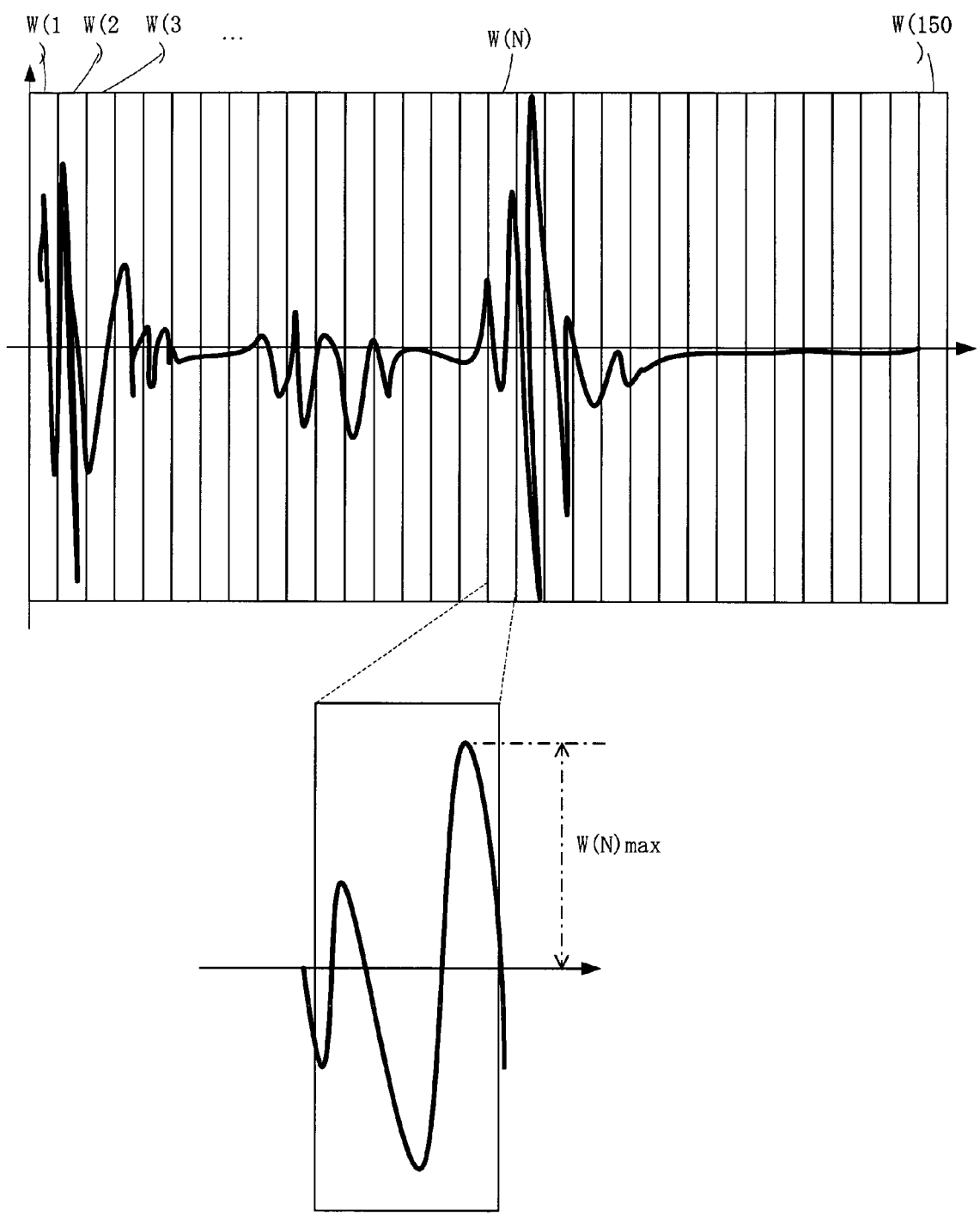
FIG. 14 is an illustrative view showing a part of an operation of the CPU core applied to FIG. 1 embodiment.
Figure 15:
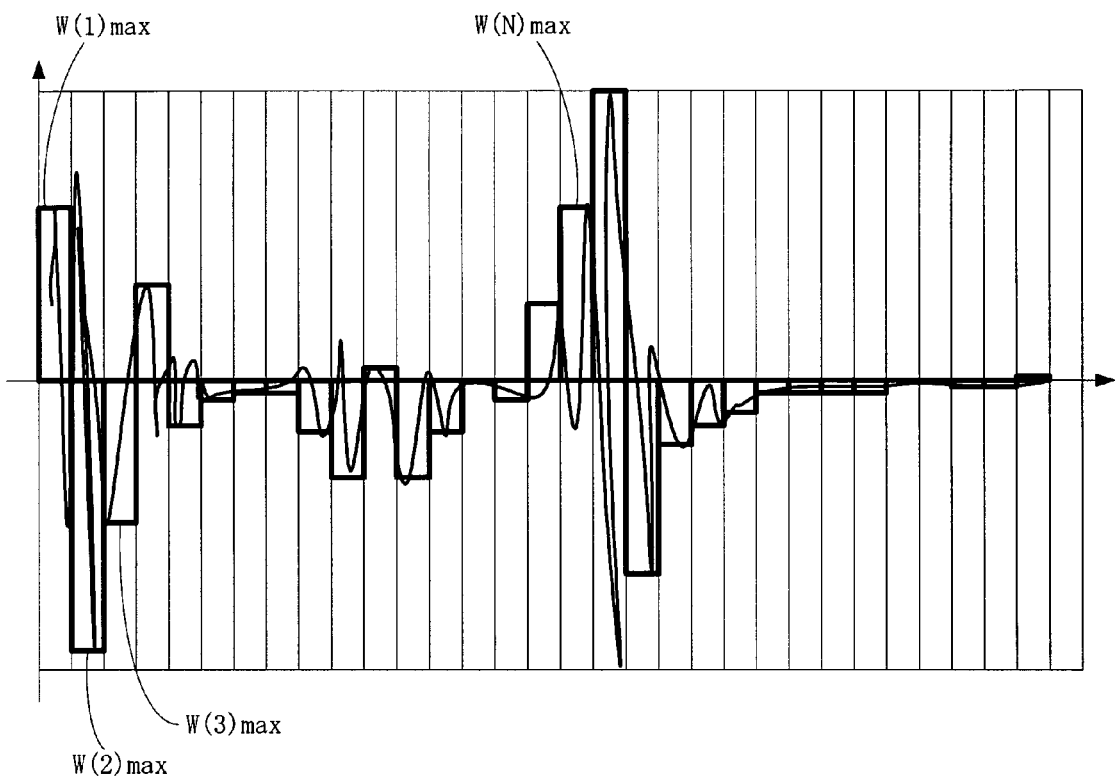
FIG. 15 is an illustrative view showing another part of the operation of the CPU core applied to FIG. 1 embodiment.
Figure 16:
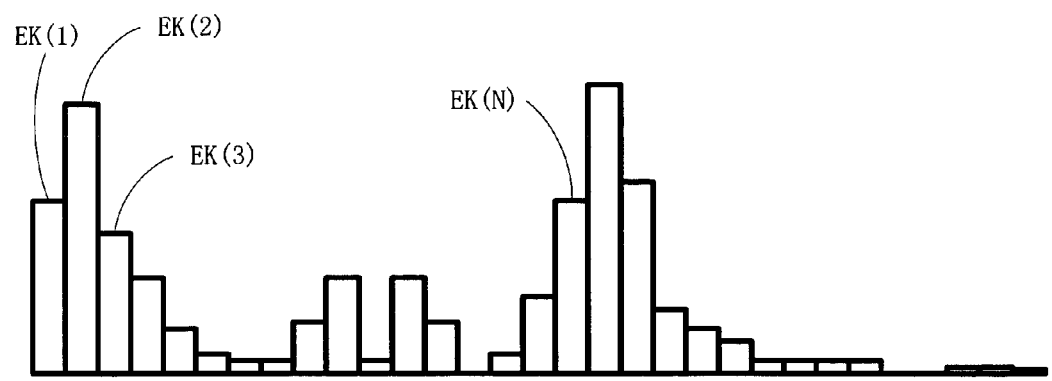
FIG. 16 is an illustrative view showing the other part of the operation of the CPU core applied to FIG. 1 embodiment.

As to the partial waveforms W (1)-W (150) shown in FIG. 14, the absolute values W (1) max-W (150) max are detected in a manner shown in FIG. 15, and set as the envelope values EK (1)-EK (150) as shown in FIG. 16.

If "YES" is determined in the step S45, the process proceeds to a step S49 to store the envelope values EK (1)-EK (150) as a registered envelope K in the registered envelope buffer 98 shown in FIG. 3.

It is determined whether or not the variable K reaches "6" in a step S51, and if "NO", the process returns to the step S25. As a result, the process similar to the above description is performed on all the menu items displayed on the menu screen shown in FIG. 12. In the registered envelope buffer 98, registered envelopes 1-6 respectively corresponding to the menu items of "jump", "stop", "right", "left", "pause" and "end" are stored. The registered envelopes 1-6 are respectively assigned to the "jump" command, the "stop" command, the "right" command, the "left" command, the "pause" command, and the "end" command. If "YES" is determined in a step S51, the process is restored to the hierarchical upper level of the routine.

Figure 17:
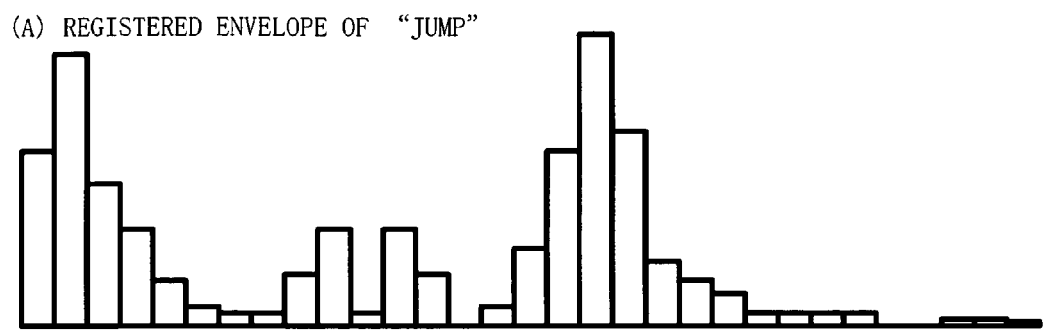
FIG. 17 (A) is an illustrative view showing one example of a registered envelope corresponding to a voice command of "jump"
Figure 17:
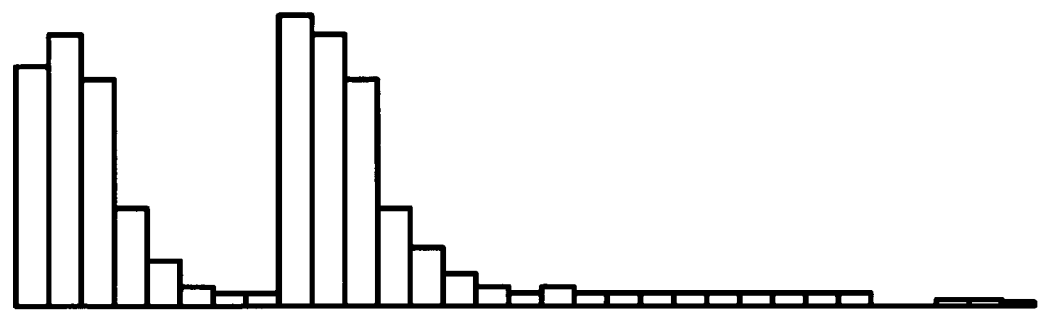

Meanwhile, in comparison to the registered envelope of "jump" shown in FIG. 17 (A), the value of the registered envelope value of "right" is changed as shown in FIG. 17(B).

Figure 7:
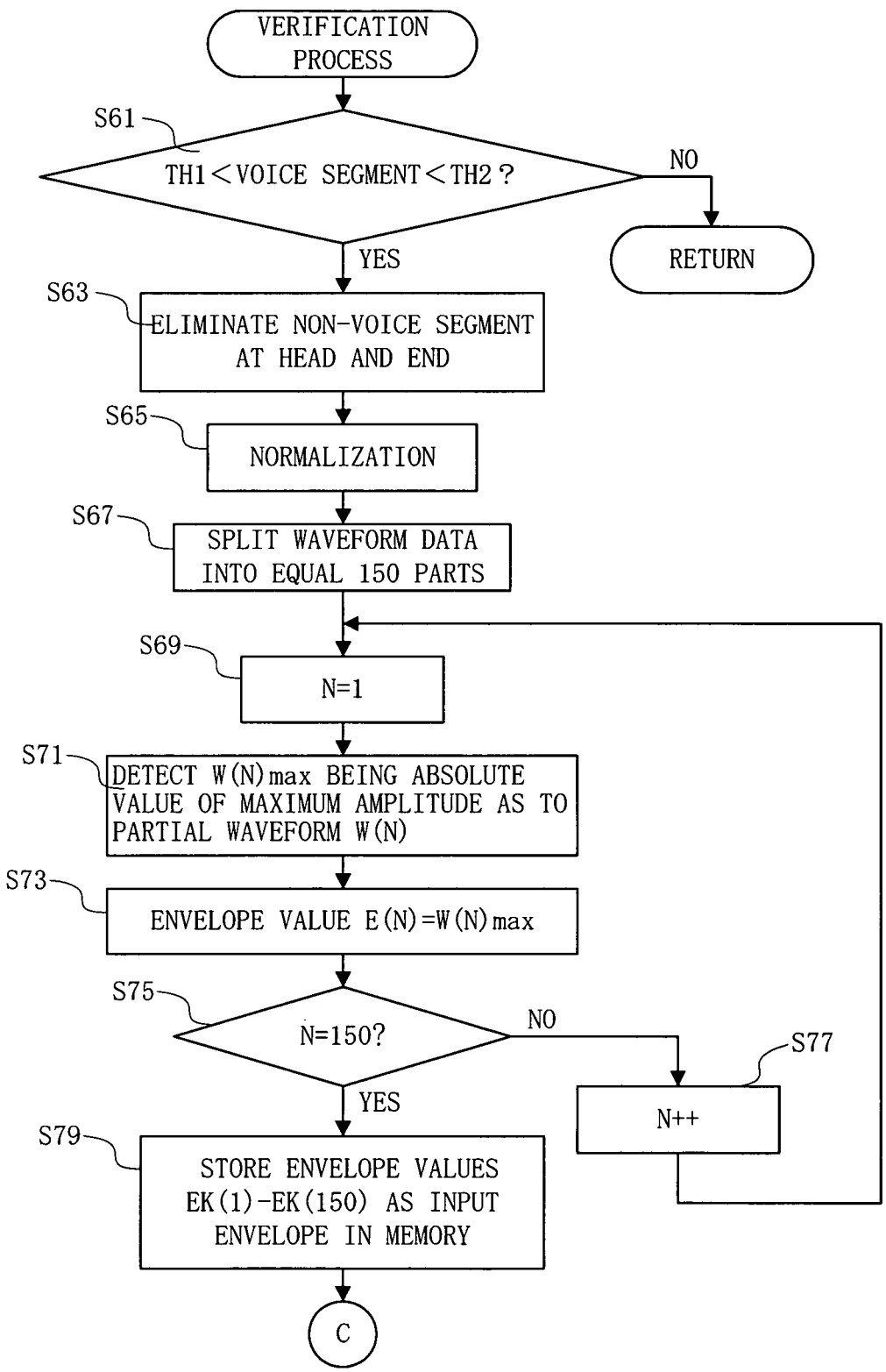
FIG. 7 is a flowchart showing a further part of the operation of the CPU core applied to FIG. 1 embodiment.
Figure 8:
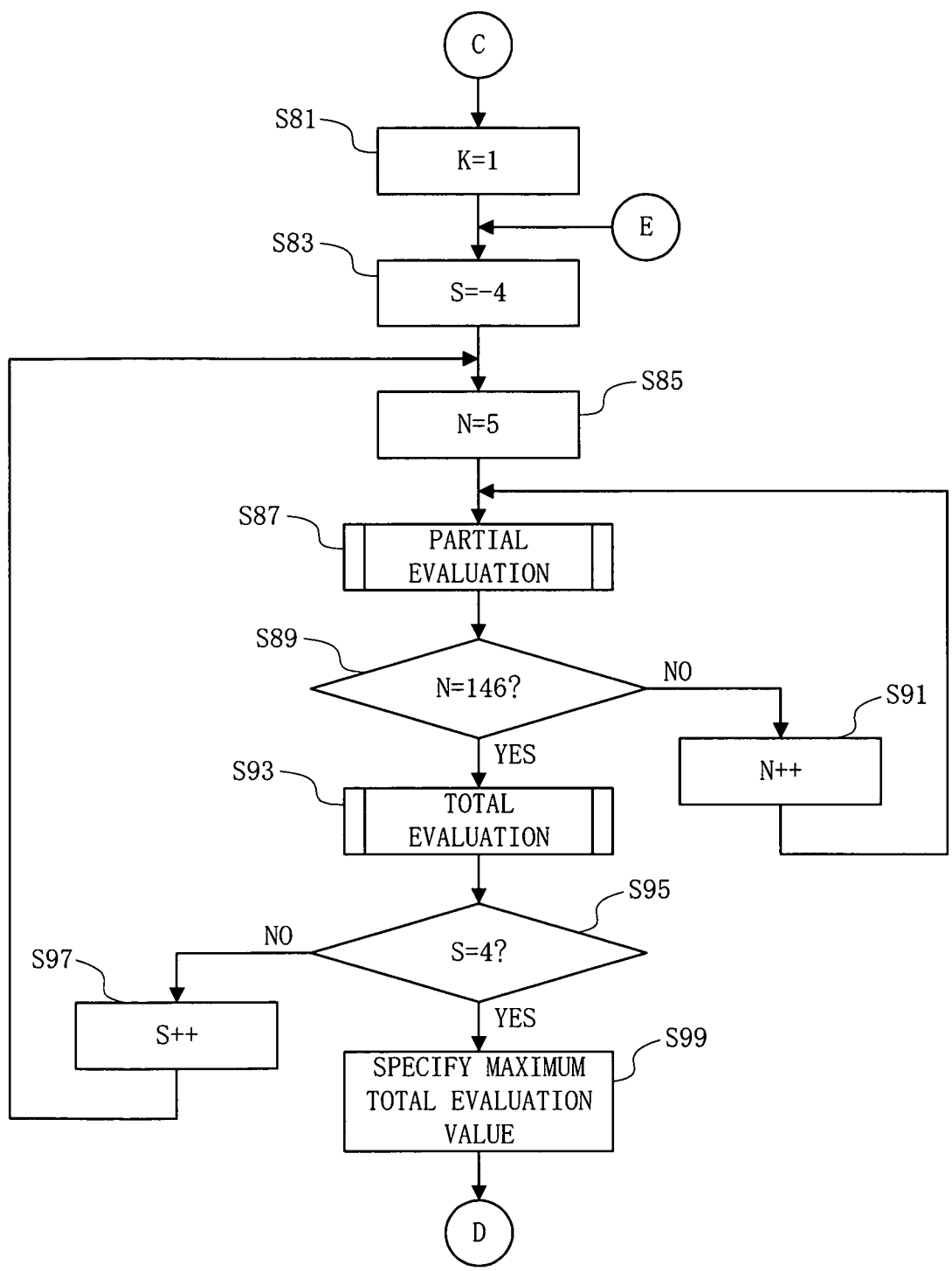
FIG. 8 is a flowchart showing another part of the operation of the CPU core applied to FIG. 1 embodiment.
Figure 9:
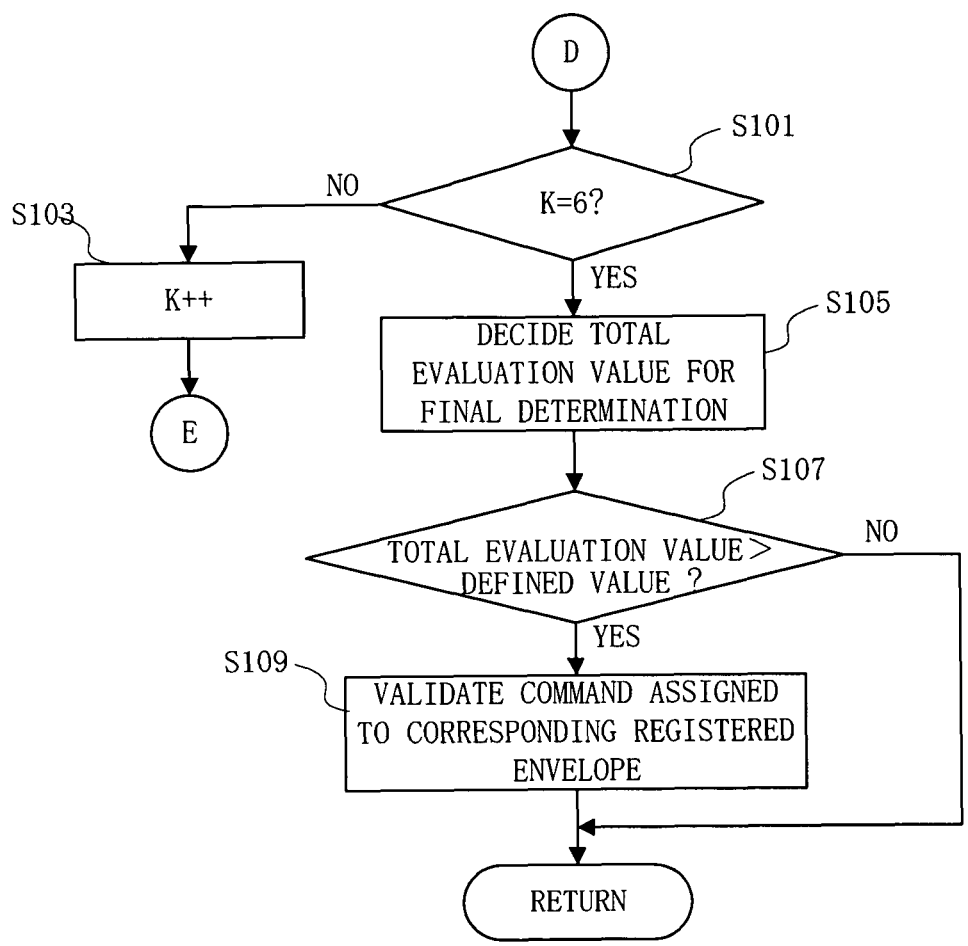
FIG. 9 is a flowchart showing the other part of the operation of the CPU core applied to FIG. 1 embodiment.

The verification process in the step S11 shown in FIG. 4 is executed according to a flowchart in FIG. 7-FIG. 9. First, a process similar to the above-described step S29 is performed in a step S61, and if "NO", the process is restored to the hierarchical upper level of the routine as it is. Accordingly, if the input voice command is too long or too short, the voice command is invalidated.

If "YES" is determined in the step S61, a process similar to the above-described step S33-S47 is executed in steps S63-S77. Accordingly, the waveform data representing a voice command input during the progress of the game is split into 150 partial waveforms W (1)-W (N), and the absolute values W (1) max-W (150) max respectively detected from the split partial waveforms W(1)-W (150) are set as the envelope values E (1)-E (150). In a step S79, the envelope values E (1)-E (150) thus obtained is stored as an input envelope in the input envelope buffer 96 shown in FIG. 3.

In a step S81, "1" is set in the variable K, and in a step S83, "−4" is set in a variable S, and in a step S85, "5" is set in the variable N. In a step S87, a difference between an envelope value EK (N) forming a registered envelope K and an envelope value E (N+S) forming the input envelope is evaluated.

It is determined whether or not the variable N reaches "146" in a step S89, and if NO, the variable N is incremented in a step S91, and then, the process returns to the step S87. Consequently, the partial evaluation process in the step S87 is repeated at 142 times, and a total of 142 partial evaluated values are obtained.

In a step S93, such the 142 of the partial evaluated values are totally evaluated, and in a step S95, it is determined whether or not the variable S reaches "4". If the variable S is less than "4", the variable S is incremented in the step S93, and the process returns to the step S81. Consequently, a series of processing in the steps S85-S93 is repeated at nine times, and nine total evaluated values are obtained. In a step S99, a total evaluated value being a maximum numerical value is specified from among the obtained nine total evaluated values.

It is noted that the reason why a numerical value applicable to the variable N is restricted to the "5"-"146" range in the partial evaluation process is that the variable S is changed in the "−4"-"4" range is considered. The range applicable to the variable N is restricted such that a correspondence between the registered envelope and the input envelope is sure to be secured in the partial evaluation process.

Figure 18:
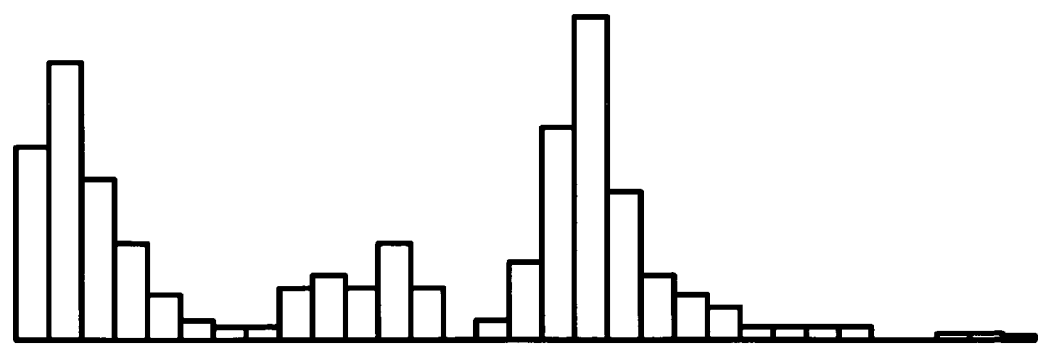
FIG. 18 is an illustrative view showing one example of an input envelope corresponding to the voice command of "jump"
Figure 19:
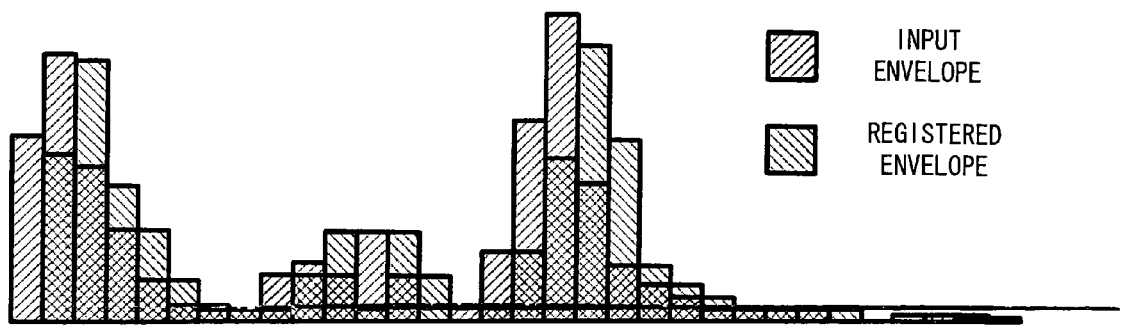
FIG. 19 (A) is an illustrative view showing one example of a verification operation between the input envelope and the registered envelope.
Figure 19:
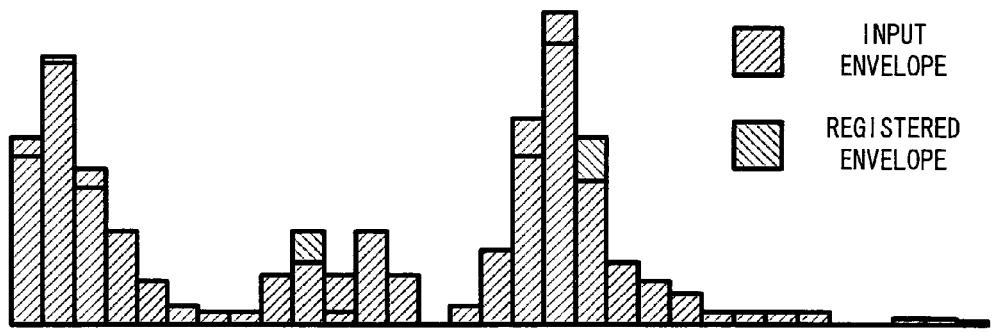
Figure 19:
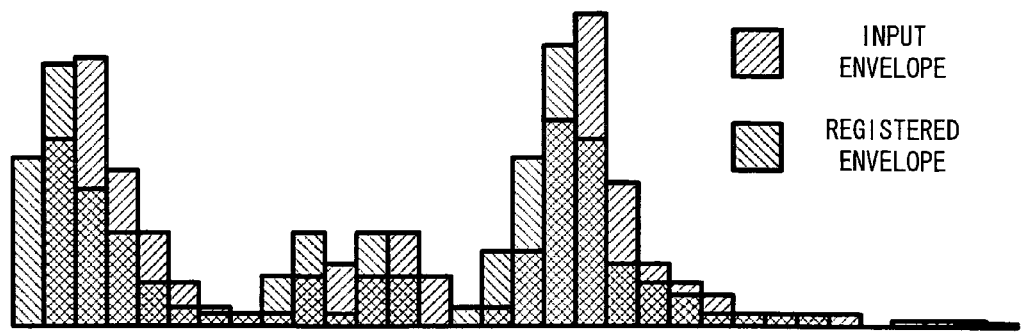

In a case that the input envelope of "jump" shown in FIG. 18 is compared to the registered envelope of "jump" shown in FIG. 17 (A), when the variable S is "−1", the difference between the input envelope and the registered envelope is evaluated in a manner shown in FIG. 19 (A), when the variable S is "0", the difference between the input envelope and the registered envelope is evaluated in a manner shown in FIG. 19 (B), and when the variable S is "+1", the difference between the input envelope and the registered envelope is evaluated in a manner shown in FIG. 19 (C).

It is determined whether or not the variable K reaches "6" in a step S101, and if "NO", the variable K is incremented in a step S103, and then, the process returns to the step S83. Accordingly, the process in the steps S83-S99 is repeated at six times, and the input envelope is compared with each of the registered envelopes 1-6. Consequently, six total evaluated values respectively relating to the registered envelopes 1-6 are obtained.

In a step S105, a total evaluated value having a maximum numerical value is detected from among the six total evaluated values thus obtained. In a step S107, it is determined whether or not the detected total evaluated value is above a defined value. If "YES" here, the process proceeds to a step S109 to validate a command assigned to a registered envelope corresponding to the detected total evaluated value. The game playing process in the step S13 shown in FIG. 4 is processed according to the validated command. After completion of the process in the step S109, the process is restored to the hierarchical upper level of the routine. On the other hand, if "NO" is determined in the step S107, the process is directly restored to the hierarchical upper level of the routine. In this case, the voice command input by the player is invalidated.

Figure 20:
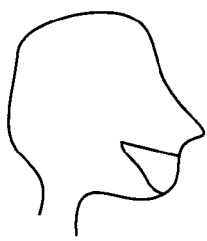
FIG. 20 (A) is an illustrative view showing a part of an operation of FIG. 1 embodiment in a game play mode.
Figure 20:
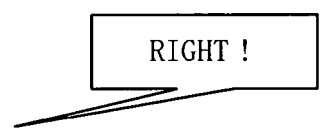
Figure 20:
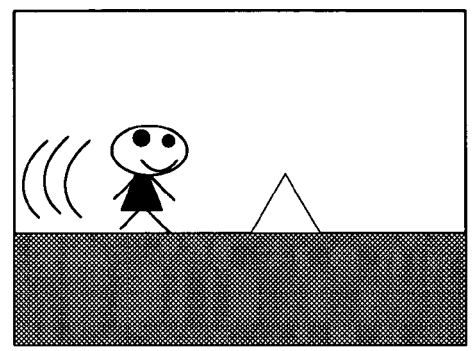
Figure 20:
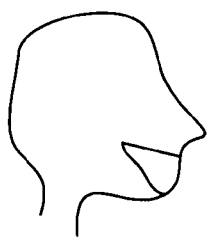
Figure 20:
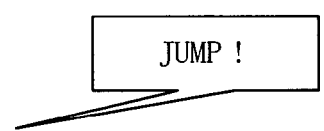
Figure 20:
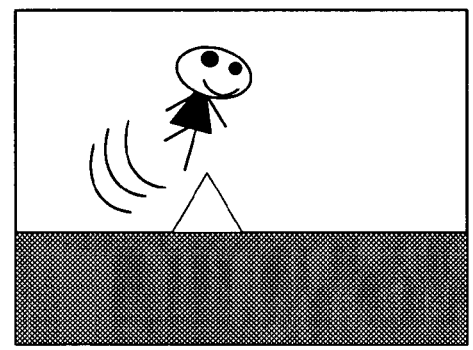

For example, when the total evaluated value corresponding to the registered envelope 3 is detected in the step S105, the "right" command assigned to the registered envelope 3 is validated. The player character moves to the right as shown in FIG. 20 (A). Furthermore, when the total evaluated value corresponding to the registered envelope 1 is detected in the step S105, the "jump" command assigned to the registered envelope 1 is validated. The player character jumps as shown in FIG. 20 (B).

Figure 10:
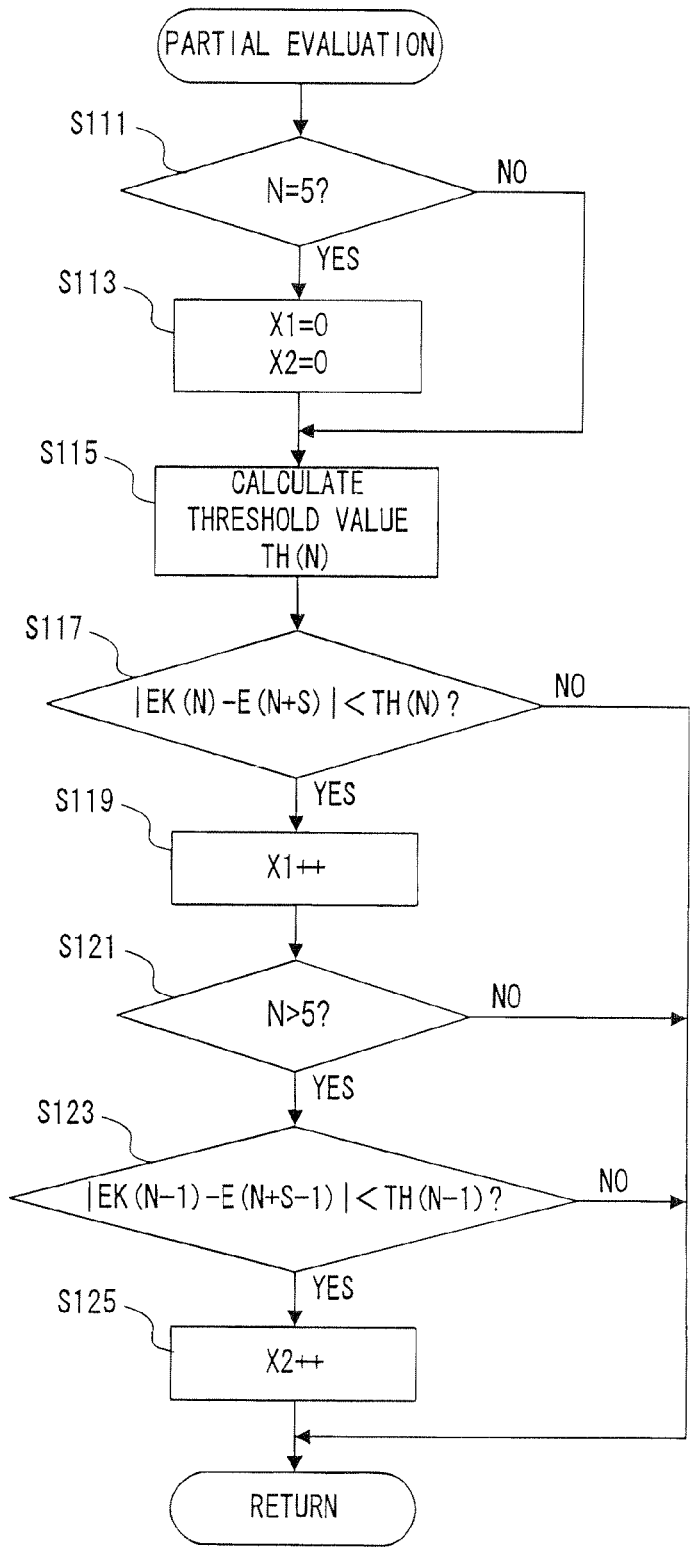
FIG. 10 is a flowchart showing a further part of the operation of the CPU core applied to FIG. 1 embodiment.

The partial evaluation process shown in the step S87 in FIG. 8 is executed according to a flowchart shown in FIG. 10. First, it is determined whether or not the variable N is "1" in a step S111. If "NO" here, the process directly proceeds to a step S115 while if "YES", "0" is set to each of the variables X1 and X2 in a step S113, and then, the process proceeds to the step S115. In the step S115, a threshold value TH (N) is calculated. The larger the envelope value EK (N) is, the larger the threshold value TH (N) is.

In a step S117, a difference absolute value |EK (N)–E (N+S)| which is a difference absolute value between the envelope values EK (N) and E (N+S) is compared to the threshold value TH (N). Here, if the difference absolute value |EK (N–E (N+S)| is equal to or more than the threshold value TH (N), the process is directly restored to the hierarchical upper level of the routine. On the other hand, if the difference absolute value |EK (N)–E (N+S)| is less than the threshold value TH (N), the variable X1 is incremented in a step S119, and it is determined whether or not the variable N is above "1" in a step S121.

If "NO" in the step S121, the process is directly restored to the hierarchical upper level of the routine. If "YES" in the step S121, the process proceeds to a step S123 to compare a difference absolute value |EK (N–1)–E (N+S–1)| which is a difference absolute value between the envelope values EK (N–1) and E (N+S–1) to the threshold value TH (N–1). Then, if the difference absolute value |EK (N–1)–E (N+S–1)| is equal to or more than the threshold value TH (N–1), the process is restored to the hierarchical upper level of the routine. On the other hand, if the difference absolute value |EK (N–1)–E (N+S–1)| is less than the threshold value TH (N–1), the variable X2 is incremented in a step S125, and then, the process is restored to the hierarchical upper level of the routine.

By repeating such the process at 142 times, the variable X1 indicates the number of the partial waveforms having approximately the same envelope value between the registered envelope and the input envelope, and the variable X2 indicates the number of partial waveforms approximately the same envelope value as to the adjacent partial waveforms.

Figure 11:
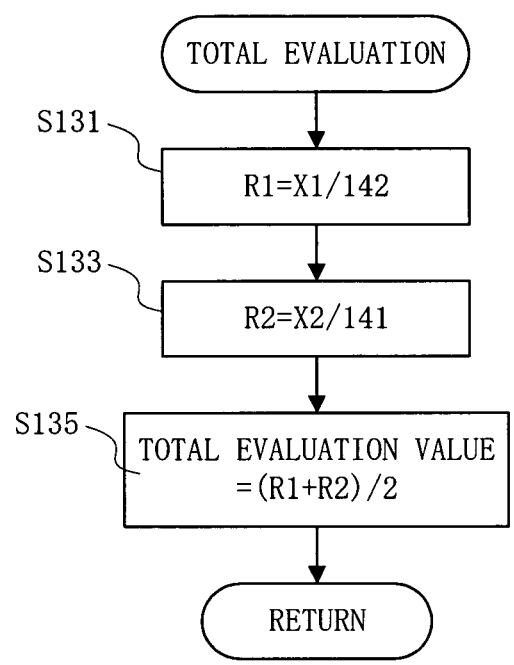
FIG. 11 is flowchart showing another part of the operation of the CPU core applied to FIG. 1 embodiment.

The total evaluation process in the step S93 shown in FIG. 8 is executed according to a flowchart shown in FIG. 11. In a step S131, the variable X1 is divided by "142" to acquire a coefficient R1, and in a step S133, the variable X2 is divided by "141" to acquire a coefficient R2. The coefficient R1 indicates a ratio of the partial waveforms having approximately the same envelope value between the registered envelope and the input envelope, and the coefficient R2 indicates a ratio of the partial waveforms having approximately the same envelope value as to the adjacent partial waveforms. In a step S135, an average value between the coefficients R1 and R2 is calculated as a total evaluation value, and after completion of the calculation process, the process is restored to the hierarchical upper level of the routine.

As can be understood from the above-description, the input envelope (input waveform information) includes a plurality of envelope values (amplitude values) detected from a voice waveform input in a real time manner, and the registered envelope (registered waveform information) includes a plurality of envelope values detected from a voice waveform input in advance. The input envelope is created in the steps S63-S79, and stored in the input envelope buffer 96 of the RAM 48. The registered envelope is stored in the registered envelope buffer 98 of the RAM 48. The difference of the envelope value between the input envelope and the registered envelope is evaluated in the steps S87-S93. If the evaluated value satisfies the condition, a process according to the command assigned to the registered envelope is executed in the step S13. Thus, the difference of the envelope values is evaluated, and therefore, it is possible to execute a process corresponding to the input voice command at a small load.

Furthermore, only the voice having a voice section whose length is equal to or larger than the threshold value TH 1 and is equal to or less than the threshold value TH2 is validated (S61), and therefore, the determination result is less influenced by a length of the voice. In addition, the waveform information does not include information relating to the frequency, and therefore, the determination result is less influenced by a tone. Consequently, accuracy of the determination is improved.

It is noted that the present embodiment is for performing the above-described simple process considering the fact that there is no need to completely analyze the voice in a game such as an action game that is restricted in command, that is, the game restricted in command does not need a process at a large load such as specifying a word indicated by the input voices by analyzing distribution of the frequency.

It is noted that although the LCDs 12 and 14 are vertically arranged in the above-described embodiment, the arrangement of the two LCDs may be changed as necessary. That is, the LCDs 12 and 14 may horizontally be arranged.

Furthermore, although two LCDs each displaying a screen are provided in the above-described embodiment, the number of the LCDs as a display portion may be changed as necessary. That is, it is appropriate that one LCD in the longitudinal shape is provided, and by vertically dividing the area, the touch panel 22 is provided on one side of the area. Thus, it is possible to display two images on the respective areas. Or, it is appropriate that one LCD in the transverse shape is provided, and by horizontally dividing the area, the touch panel 22 is provided on one side of the area. Thus, it is possible to display two images on the respective areas.

Although the exemplary embodiment presented herein has been described and illustrated in detail, it is clearly understood that the same is by way of illustration and example only and is not to be taken by way of limitation, the spirit and scope being limited only by the terms of the appended claims.

What is claimed is:

1. A command processing apparatus, comprising:
a creating programmed logic circuitry for creating input waveform information including a plurality of amplitude values on a voice waveform input in real time, determined by splitting the input voice waveform into a plurality of partial waveforms, each partial waveform providing one amplitude value;
storing locations for storing registered waveform information including a plurality of amplitude values on a voice waveform input in advance, determined by splitting the voice waveform input in advance into a plurality of partial waveforms, each partial waveform providing one amplitude value;
an evaluating programmed logic circuitry for acquiring an evaluated value, said evaluating programmed logic circuitry calculating difference values between said plurality of amplitude values of said partial input waveforms and said plurality of amplitude values of said respective registered partial waveforms on a point-by-point basis, and detecting the number of the difference values each being less than a threshold value, thereby to acquire said evaluated value on the basis of the detected number; and
an executing programmed logic circuitry for executing a process corresponding to a command assigned to the registered waveform information when the evaluated value acquired by said evaluating programmed logic circuitry satisfies a condition.

2. A command processing apparatus according to claim 1, wherein amplitude values belonging to the respective input waveforms and registered waveforms are represented by an absolute value.

3. A command processing apparatus according to claim 1, wherein each of the input waveform information and the registered waveform information has L (L: integer equal to two or more) amplitude values which are respectively detected at L positions, and said evaluating programmed logic circuitry evaluates differences between M (M: integer less than L) amplitude values that are included in the input waveforms and respectively correspond to M detecting positions, and M amplitude values that are included in the registered waveforms and respectively correspond to M detecting positions, and
said command processing apparatus further comprising changing programmed logic circuitry for changing the noticed M detecting positions as to one of the input waveforms and the registered waveform information every time that an evaluating process of said evaluating programmed logic circuitry is completed.

4. A command processing apparatus according to claim 3, wherein said changing programmed logic circuitry changes the noticed M detecting positions at N times (N: an integer less than "L-M"), and said command processing apparatus further comprising specifying programmed logic circuitry for specifying an optimum evaluated value from among the N evaluated values acquired by said evaluating programmed logic circuitry, wherein said executing programmed logic circuitry notices the optimum evaluated value.

5. A command processing apparatus according to claim 3, wherein said evaluating programmed logic circuitry includes a first position specifying programmed logic circuitry for specifying a first detecting position which satisfies a first condition, a second position specifying programmed logic circuitry for specifying a second detecting position which satisfies a second condition, and calculating programmed logic circuitry for calculating the evaluated value on the basis of the number of the first detecting positions and the number of the second detecting positions, and the first condition is a condition that the difference is below a threshold value, and the second condition is a condition that the difference at a detecting position anteriorly adjacent to the first detecting position is below the threshold value.

6. A command processing apparatus according to claim 5, wherein said evaluating programmed logic circuitry further includes threshold value changing programmed logic circuitry for changing for each detecting position a numerical value indicated by the threshold value on the basis of the amplitude values of the registered waveforms.

7. A command processing apparatus according to claim 6, wherein said threshold value changing programmed logic circuitry increases the numerical value as the amplitude values are large.

8. A command processing apparatus according to claim 1, wherein said storing locations store the registered waveforms in correspondence to a plurality of commands, and said evaluating programmed logic circuitry acquires the evaluated value with respect to each of the plurality of commands.

9. The command processing apparatus according to claim 1, wherein
said creating input waveform information includes taking the maximum amplitude value within each partial waveform of the input voice waveform as the said amplitude value, and said storing registered waveform information includes taking the maximum amplitude value within each partial waveform of the voice waveform input in advance as the said amplitude value.

10. A command processing program that is embedded on a non-transitory memory for storing registered waveform information including a plurality of amplitude values on a voice waveform input in advance, determined by splitting the voice waveform input in advance into a plurality of partial waveforms, each partial waveform providing one amplitude value, and is executed by a processor of a command processing apparatus, the processor performing:
creating input waveform information including a plurality of amplitude values on a voice waveform input in real time, determined by splitting the input voice waveform into a plurality of partial waveforms, each partial waveform providing one amplitude value;
acquiring an evaluated value, said evaluation including calculating difference values between said plurality of amplitude values of said partial input waveforms and said plurality of amplitude values of said respective registered partial waveforms on a point-by-point basis, and detecting the number of the difference values each being less than a threshold value, thereby to acquire said evaluated value on the basis of the detected number; and
executing a process corresponding to a command assigned to the registered waveform information when the evaluated value acquired by said evaluation satisfies a condition.

11. A command processing program according to claim 10, wherein amplitude values belonging to the respective input waveforms and the registered waveforms are represented by an absolute value.

12. A command processing program according to claim 10, wherein each of the input waveforms and the registered waveforms has L (L: integer equal to two or more) amplitude values which are respectively detected at L positions, and said evaluation evaluates differences between M (M: integer less than L) amplitude values that are included in the input waveforms and respectively correspond to M detecting positions, and M amplitude values that are included in the registered waveforms and respectively correspond to M detecting positions, and said command processing program further comprising changing the noticed M detecting positions as to one of the input waveforms and the registered waveforms every time that an evaluating process of said evaluation is completed.

13. A command processing program according to claim 12, wherein said changing changes the noticed M detecting positions at N times (N: an integer less than "L-M"), and said command processing program further comprising specifying an optimum evaluated value from among the N evaluated values acquired by said evaluation, wherein said execution notices the optimum evaluated value.

14. A command processing program according to claim 12, wherein said evaluating includes a first position specifying for specifying a first detecting position which satisfies a first condition, a second position specifying for specifying a second detecting position which satisfies a second condition, and calculating the evaluated value on the basis of the number of the first detecting positions and the number of the second detecting positions, and the first condition is a condition that the difference is below a threshold value, and the second condition is a condition that the difference at a detecting position anteriorly adjacent to the first detecting position is below the threshold value.

15. A command processing program according to claim 14, wherein said evaluating further includes threshold value changing for changing for each detecting position a numerical value indicated by the threshold value on the basis of the amplitude values of the registered waveforms.

16. A command processing program according to claim 15, wherein said threshold value changing increases the numerical value as the amplitude values are large.

17. A command processing program according to claim 10, wherein said memory stores the registered waveform information in correspondence to a plurality of commands, and said evaluating acquires the evaluated value with respect to each of the plurality of commands.

18. The command processing program according to claim 10, wherein said creating input waveform information includes taking the maximum amplitude value within each partial waveform of the input voice waveform as the said amplitude value, and said storing registered waveform information includes taking the maximum amplitude value within each partial waveform of the voice waveform input in advance as the said amplitude value.

19. A command processing apparatus, comprising:
a creating programmed logic circuitry for creating input waveform information including a plurality of amplitude values on a voice waveform input in real time, determined by splitting the input voice waveform into a plurality of partial waveforms, each partial waveform providing one amplitude value;
storing locations for storing registered waveform information including a plurality of amplitude values on a voice waveform input in advance, determined by splitting the voice waveform input in advance into a plurality of partial waveforms, each partial waveform providing one amplitude value;
an evaluating programmed logic circuitry for acquiring an evaluated value, said evaluating programmed logic circuitry calculating difference values between said plurality of amplitude values of said partial input waveforms and said plurality of amplitude values of said respective registered partial waveforms on a point-by-point basis, and detecting the number of the difference values each being less than a threshold value, thereby to acquire said evaluated value on the basis of the detected number;
an executing programmed logic circuitry for executing a process corresponding to a command assigned to the registered waveform information when the evaluated value acquired by said evaluating programmed logic circuitry satisfies a condition, wherein each of the input waveform information and the registered waveform information has L (L: integer equal to two or more) amplitude values which are respectively detected at L positions, and said evaluating programmed logic circuitry evaluates differences between M (M: integer less than L) amplitude values that are included in the input waveform information and respectively correspond to M detecting positions, and M amplitude values that are included in the registered waveform information and respectively correspond to M detecting positions;
a changing programmed logic circuitry for changing the noticed M detecting positions as to one of the input waveform information and the registered waveform information every time that an evaluating process of said evaluating means is completed; wherein said changing programmed logic circuitry changes the noticed M detecting positions at N times (N: an integer less than "L-M"); and
a specifying programmed logic circuitry for specifying an optimum evaluated value from among the N evaluated values acquired by said evaluating programmed logic circuitry, wherein said executing programmed logic circuitry notices the optimum evaluated value, said storing locations store the registered waveform information in correspondence to a plurality of commands, and said evaluating programmed logic circuitry acquires the evaluated value with respect to each of the plurality of commands.

20. The command processing apparatus according to claim 19, wherein
said creating input waveform information includes taking the maximum amplitude value within each partial waveform of the input voice waveform as the said amplitude value, and said storing registered waveform information includes taking the maximum amplitude value within each partial waveform of the voice waveform input in advance as the said amplitude value.

21. A command processing apparatus, comprising a computer processor, configured to:
create input waveform information including a plurality of amplitude values on a voice waveform input in real time, determined by splitting the input voice waveform into a plurality of partial waveforms, each partial waveform providing one amplitude value;
store a plurality of registered waveform information including a plurality of amplitude values on a voice waveform input in advance, determined by splitting the voice waveform input in advance into a plurality of partial waveforms, each partial waveform providing one amplitude value, said plurality of registered waveform information being individually assigned with different commands;
acquire a plurality of evaluated values in correspondence to said plurality of registered waveform information, calculate, for each registered waveform information, difference values between said plurality of amplitude values of said partial input waveforms and said plurality of amplitude values of said respective registered partial waveforms on a point-by-point basis, and detect the number of the difference values each being less than a threshold value, thereby to acquire said evaluated value on the basis of the detected number;

validate a command assigned to the registered waveform information that a specific one out of said plurality of evaluated values is obtainable; and execute a process corresponding to the validated command.

22. The command processing apparatus according to claim 21, wherein said creating input waveform information includes taking the maximum amplitude value within each partial waveform of the input voice waveform as the said amplitude value, and said storing registered waveform information includes taking the maximum amplitude value within each partial waveform of the voice waveform input in advance as the said amplitude value.

23. A method for executing a process according to an input voice command, the method comprising:

creating, via one or more processing devices, input waveform information including a plurality of amplitude values on a voice waveform input in real time, determined by splitting the input voice waveform into a plurality of partial waveforms, each partial waveform providing one amplitude value;

storing, via one or more processing devices, registered waveform information in storing locations, said registered waveform information including a plurality of amplitude values on a voice waveform input in advance, determined by splitting the voice waveform input in advance into a plurality of partial waveforms, each partial waveform providing one amplitude value;

acquiring an evaluated value, via one or more processing devices, said acquiring comprising calculating difference values between said plurality of amplitude values of said partial input waveforms and said plurality of amplitude values of said respective registered partial waveforms on a point-by-point basis, and detecting the number of the difference values each being less than a threshold value, thereby to acquire said evaluated value on the basis of the detected number; and executing, via one or more processing devices, a process corresponding to a command assigned to the registered waveform information when the evaluated value acquired by said acquiring satisfies a condition.

24. A command processing apparatus comprising a computer processor configured to:

create input waveform information including a plurality of amplitude values on a voice waveform input in real time, determined by splitting the input voice waveform into a plurality of partial waveforms, each partial waveform providing one amplitude value;

store in storing locations registered waveform information including a plurality of amplitude values on a voice waveform input in advance, determined by splitting the voice waveform input in advance into a plurality of partial waveforms, each partial waveform providing one amplitude value;

acquire an evaluated value, said acquiring comprising calculating difference values between said plurality of amplitude values of said partial input waveforms and said plurality of amplitude values of said respective registered partial waveforms on a point-by-point basis, and detecting the number of the difference values each being less than a threshold value, thereby to acquire said evaluated value on the basis of the detected number; and execute a process corresponding to a command assigned to the registered waveform information when the evaluated value acquired by said acquiring satisfies a condition.

25. A command processing apparatus, comprising:

one or more displays;

one or more processing devices configured to:

create input waveform information including a plurality of amplitude values on a voice waveform input in real time, determined by splitting the input voice waveform into a plurality of partial waveforms, each partial waveform providing one amplitude value;

store registered waveform information including a plurality of amplitude values on a voice waveform input in advance, determined by splitting the voice waveform input in advance into a plurality of partial waveforms, each partial waveform providing one amplitude value;

acquire an evaluated value, by calculating difference values between said plurality of amplitude values of said partial input waveforms and said plurality of amplitude values of said respective registered partial waveforms on a point-by-point basis, and detect the number of the difference values each being less than a threshold value, thereby to acquire said evaluated value on the basis of the detected number; and execute a process on said one or more displays corresponding to a command assigned to the registered waveform information when the acquired evaluated value satisfies a condition.

* * * * *